US008667170B2

(12) United States Patent
Matsuura

(10) Patent No.: US 8,667,170 B2
(45) Date of Patent: Mar. 4, 2014

(54) ADDRESS CONVERSION METHOD, ACCESS CONTROL METHOD, AND DEVICE USING THESE METHODS

(75) Inventor: Katsunori Matsuura, Koganei (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 2167 days.

(21) Appl. No.: 10/558,629

(22) PCT Filed: Apr. 14, 2005

(86) PCT No.: PCT/JP2005/007254
§ 371 (c)(1),
(2), (4) Date: Nov. 30, 2005

(87) PCT Pub. No.: WO2005/101217
PCT Pub. Date: Oct. 27, 2005

(65) Prior Publication Data
US 2006/0259583 A1      Nov. 16, 2006

(30) Foreign Application Priority Data

Apr. 14, 2004 (JP) ................................. 2004-118740
Jul. 16, 2004 (JP) ................................. 2004-209367

(51) Int. Cl.
*G06F 15/173* (2006.01)
*G06F 15/16* (2006.01)

(52) U.S. Cl.
USPC ........... 709/238; 709/223; 709/249; 709/245; 709/218; 709/229

(58) Field of Classification Search
USPC .......................................... 709/225, 245, 238
See application file for complete search history.

(56) References Cited

U.S. PATENT DOCUMENTS 6,931,437 B2 *   8/2005   Hariu ............................ 709/218
(Continued)

FOREIGN PATENT DOCUMENTS

JP      10-308756       11/1998
JP      2002-141953     5/2002
(Continued)

OTHER PUBLICATIONS

P. Srisuresh, et al., "Middlebox communication architecture and framework", The Internet Society, Network Working Group, XP-015009080, Aug. 2002, pp. 1-35.
M. Stiemerling, et al., "Simple Middlebox Configuration (SIMCO) Protocol Version 2.0", The Internet Society, Internet Draft, XP-015005397, Feb. 2003, pp. 1-21.

*Primary Examiner* — Noel Beharry
(74) *Attorney, Agent, or Firm* — Oblon, Spivak, McClelland, Maier & Neustadt, L.L.P.

(57) ABSTRACT

The conventional address translation techniques cannot allow multiple terminal devices to be accessed by using one identical port number because they can associates one port number with only one device if the terminals do not support encapsulation.
According to the present invention, access from a global network to a private network is restricted in accordance with an access control rule established for each device or network sending a packet. Furthermore, address translation is performed in accordance with address translation rules established on a per sending device basis to provide communication between a global network and a private network.
When a connection request is received from the global network and if authentication of the connection request is successful, an access control rule is established on a per sending device basis or on a per sending network basis and recorded. After the communication ends, the added access control rule and address translation rule are deleted.

5 Claims, 22 Drawing Sheets

(56) References Cited

U.S. PATENT DOCUMENTS

| | | | |
|---|---|---|---|
| 7,574,522 B2* | 8/2009 | Oguchi | 709/238 |
| 2002/0133582 A1* | 9/2002 | Shibata | 709/223 |
| 2003/0115327 A1 | 6/2003 | Kokado et al. | |
| 2004/0100976 A1* | 5/2004 | Chang et al. | 370/401 |

FOREIGN PATENT DOCUMENTS

| | | |
|---|---|---|
| JP | 2002-185517 | 6/2002 |
| JP | 2002-232450 | 8/2002 |
| JP | 2003-85059 | 3/2003 |
| JP | 2003-132020 | 5/2003 |

\* cited by examiner

FIG. 3

| SOURCE IP ADDRESS | PROTOCOL /SOURCE PORT NUMBER | DESTINATION IP ADDRESS | PROTOCOL /DESTINATION PORT NUMBER | ACTION |
|---|---|---|---|---|
| any | any | 111.111.111.2 | http | ACCEPT |
| 123.123.123.1 | any | 111.111.111.2 | ssh | ACCEPT |
| any | any | any | any | DROP |

FIG. 4

| SOURCE IP ADDRESS | DESTINATION IP ADDRESS | PROTOCOL /DESTINATION PORT NUMBER | INTERNAL IP ADDRESS | PROTOCOL AND PORT NUMBER |
|---|---|---|---|---|
| any | 111.111.111.2 | TCP 80 | 192.168.100.5 | TCP 80 |
| 123.123.123.1 | 111.111.111.2 | TCP 22 | 192.168.100.5 | TCP 22 |

FIG. 6

| SOURCE IP ADDRESS | PROTOCOL /SOURCE PORT NUMBER | DESTINATION IP ADDRESS | PROTOCOL /DESTINATION PORT NUMBER | ACTION |
|---|---|---|---|---|
| 111.222.234.123 | any | 111.111.111.2 | ssl | ACCEPT |
| any | any | 111.111.111.2 | http | ACCEPT |
| 123.123.123.1 | any | 111.111.111.2 | ssl | ACCEPT |
| any | any | any | any | DROP |

FIG. 7

| SOURCE IP ADDRESS | DESTINATION IP ADDRESS | PROTOCOL /DESTINATION PORT NUMBER | INTERNAL IP ADDRESS | PROTOCOL AND PORT NUMBER |
|---|---|---|---|---|
| 111.222.234.123 | 111.111.111.2 | TCP 22 | 192.168.100.4 | TCP 22 |
| any | 111.111.111.2 | TCP 80 | 192.168.100.5 | TCP 80 |
| 123.123.123.1 | 111.111.111.2 | TCP 22 | 192.168.100.5 | TCP 22 |

FIG. 10

| SOURCE IP ADDRESS | PROTOCOL /SOURCE PORT NUMBER | DESTINATION IP ADDRESS | PROTOCOL /DESTINATION PORT NUMBER | ACTION |
|---|---|---|---|---|
| 111.222.234.123 | IPsec | 211.250.250.100 | IPsec | ACCEPT |

FIG. 11

| SOURCE IP ADDRESS | DESTINATION IP ADDRESS | PROTOCOL /DESTINATION PORT NUMBER | INTERNAL IP ADDRESS | PROTOCOL AND PORT NUMBER |
|---|---|---|---|---|
| 111.222.234.123 | 211.250.250.100 | IPsec | 192.168.100.2 | IPsec |

FIG. 12

| SOURCE IP ADDRESS | DESTINATION IP ADDRESS | PROTOCOL /DESTINATION PORT NUMBER | INTERNAL IP ADDRESS | PROTOCOL AND PORT NUMBER |
|---|---|---|---|---|
| 211.250.250.100 | 111.222.234.123 | IPsec | 192.168.20.2 | IPsec |

FIG. 13

| SOURCE IP ADDRESS | PROTOCOL /SOURCE PORT NUMBER | DESTINATION IP ADDRESS | PROTOCOL /DESTINATION PORT NUMBER | ACTION |
|---|---|---|---|---|
| 211.250.250.100 | IPsec | 111.222.234.123 | IPsec | ACCEPT |

FIG. 15

| SOURCE IP ADDRESS | SOURCE PORT NUMBER | DESTINATION IP ADDRESS | PROTOCOL /DESTINATION PORT NUMBER | ACTION |
|---|---|---|---|---|
| any | any | 123.123.123.123 | https | ACCEPT |
| 211.250.250.100 | any | 123.123.123.123 | ssh | ACCEPT |
| any | any | any | any | DROP |

FIG. 16

| SOURCE IP ADDRESS | DESTINATION IP ADDRESS | PROTOCOL /DESTINATION PORT NUMBER | INTERNAL IP ADDRESS | PROTOCOL AND PORT NUMBER |
|---|---|---|---|---|
| any | 123.123.123.123 | TCP 443 | 192.168.100.5 | TCP 443 |
| 211.250.250.100 | 123.123.123.123 | TCP 22 | 192.168.100.5 | TCP 22 |

FIG. 19

| SOURCE IP ADDRESS | SOURCE PORT NUMBER | DESTINATION IP ADDRESS | PROTOCOL /DESTINATION PORT NUMBER | ACTION |
|---|---|---|---|---|
| 111.222.234.123 | any | 123.123.123.123 | http | ACCEPT |

FIG. 20

| SOURCE IP ADDRESS | DESTINATION IP ADDRESS | PROTOCOL /DESTINATION PORT NUMBER | INTERNAL IP ADDRESS | PROTOCOL AND PORT NUMBER |
|---|---|---|---|---|
| 111.222.234.123 | 123.123.123.123 | TCP 80 | 192.168.100.4 | TCP 80 |

FIG. 21

| SOURCE IP ADDRESS | SOURCE PORT NUMBER | DESTINATION IP ADDRESS | PROTOCOL /DESTINATION PORT NUMBER | ACTION |
|---|---|---|---|---|
| 111.222.234.123 | any | 123.123.123.123 | http | ACCEPT |
| any | any | 123.123.123.123 | https | ACCEPT |
| 211.250.250.100 | any | 123.123.123.123 | ssl | ACCEPT |
| any | any | any | any | DROP |

FIG. 22

| SOURCE IP ADDRESS | DESTINATION IP ADDRESS | PROTOCOL /DESTINATION PORT NUMBER | INTERNAL IP ADDRESS | PROTOCOL AND PORT NUMBER |
|---|---|---|---|---|
| 111.222.234.123 | 123.123.123.123 | TCP 80 | 192.168.100.4 | TCP 80 |
| any | 123.123.123.123 | TCP 443 | 192.168.100.5 | TCP 443 |
| 211.250.250.100 | 123.123.123.123 | TCP 22 | 192.168.100.5 | TCP 22 |

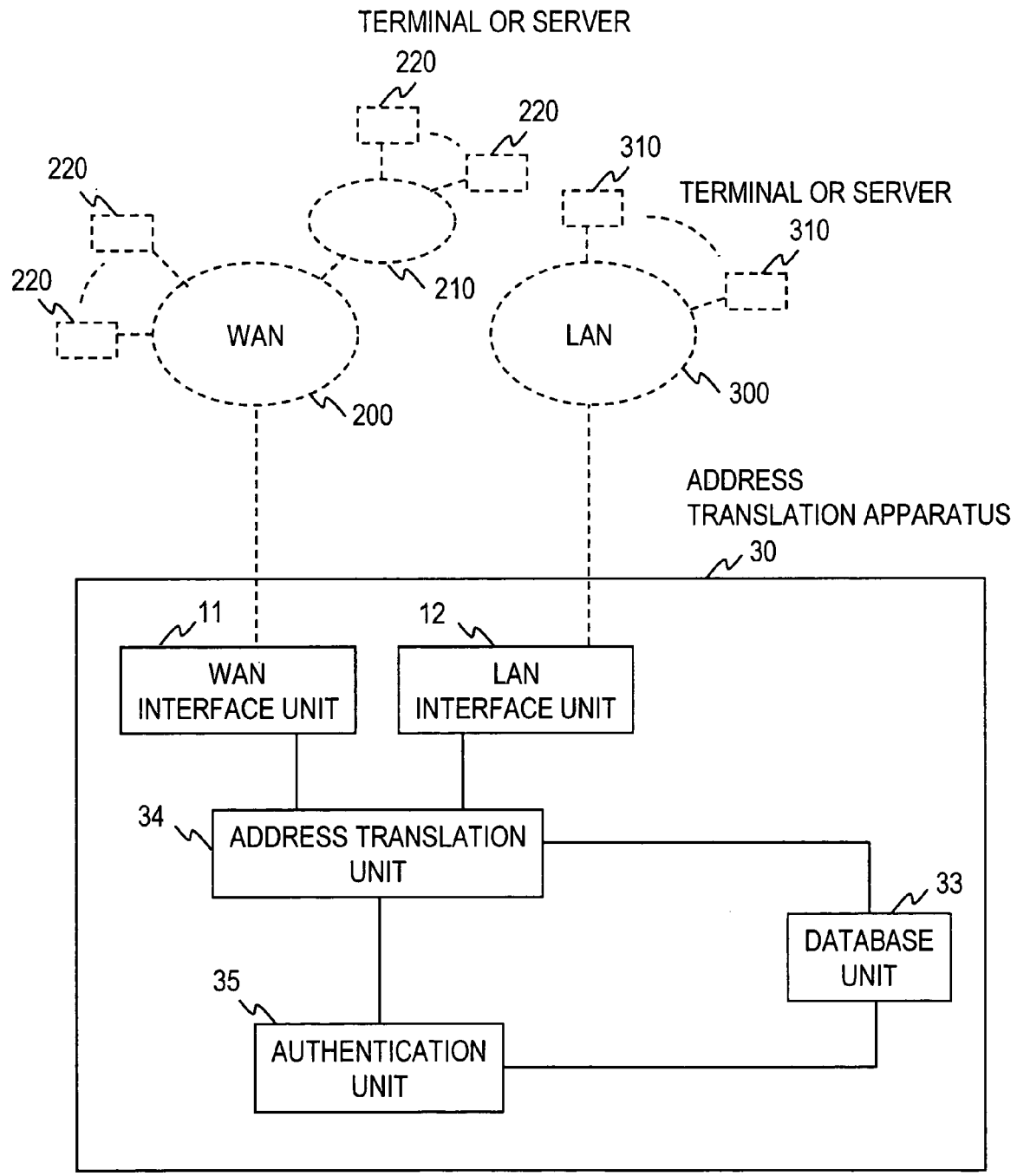

FIG. 24

| SOURCE IP ADDRESS | DESTINATION IP ADDRESS | PROTOCOL /DESTINATION PORT NUMBER | INTERNAL IP ADDRESS | PROTOCOL AND PORT NUMBER |
|---|---|---|---|---|
| any | 123.123.123.123 | TCP 443 | 192.168.100.5 | TCP 443 |
| any | 123.123.123.123 | TCP 22 | 192.168.100.5 | TCP 22 |

FIG. 25

| SOURCE IP ADDRESS | DESTINATION IP ADDRESS | PROTOCOL /DESTINATION PORT NUMBER | INTERNAL IP ADDRESS | PROTOCOL AND PORT NUMBER |
|---|---|---|---|---|
| 111.222.234.123 | 123.123.123.123 | TCP 22 | 192.168.100.4 | TCP 22 |
| any | 123.123.123.123 | TCP 443 | 192.168.100.5 | TCP 443 |
| any | 123.123.123.123 | TCP 22 | 192.168.100.5 | TCP 22 |

FIG. 30

| SOURCE IP ADDRESS | SOURCE PORT NUMBER | DESTINATION IP ADDRESS | PROTOCOL /DESTINATION PORT NUMBER | ACTION |
|---|---|---|---|---|
| any | any | 111.111.111.2 | http | ACCEPT |
| 123.123.123.1 | any | 111.111.111.* | https(ssl) | ACCEPT |
| any | any | any | any | DROP |

FIG. 31

| SOURCE IP ADDRESS | SOURCE PORT NUMBER | DESTINATION IP ADDRESS | PROTOCOL /DESTINATION PORT NUMBER | ACTION |
|---|---|---|---|---|
| 123.123.111.1 | any | 111.111.111.3 | ftp | ACCEPT |
| any | any | 111.111.111.2 | http | ACCEPT |
| 123.123.123.1 | any | 111.111.111.* | https(ssl) | ACCEPT |
| any | any | any | any | DROP |

FIG. 32

| SOURCE IP ADDRESS | SOURCE PORT NUMBER | DESTINATION IP ADDRESS | PROTOCOL /DESTINATION PORT NUMBER | ACTION |
|---|---|---|---|---|
| 123.123.111.0/24 | any | 111.111.111.3 | ftp | ACCEPT |
| any | any | 111.111.111.2 | http | ACCEPT |
| 123.123.123.1 | any | 111.111.111.* | https(ssl) | ACCEPT |
| any | any | any | any | DROP |

FIG. 33

| SOURCE IP ADDRESS | PROTOCOL /SOURCE PORT NUMBER | DESTINATION IP ADDRESS | PROTOCOL /DESTINATION PORT NUMBER | ACTION |
|---|---|---|---|---|
| 123.123.111.0/24 | any | 111.111.111.3 | ftp | ACCEPT |
| any | any | 111.111.111.2 | http | ACCEPT |
| 123.123.123.1 | any | 111.111.111.2 | ssl | ACCEPT |
| any | any | any | any | DROP |

ADDRESS CONVERSION METHOD, ACCESS CONTROL METHOD, AND DEVICE USING THESE METHODS

TECHNICAL FIELD

The present invention relates to an address translation technique and an access control technique (firewall technique) for terminals on a private network that do not have addresses on a global network to perform communications over the global network.

BACKGROUND ART

There have been address translation techniques (network address translation (NAT) techniques), which are provided between a global network and a private network, for example between a wide area network (WAN) such as the Internet and a local area network (LAN) such as an Ethernet (registered trademark) network, translate the destination address of a packet sent from the WAN to a terminal device on the LAN from a global IP address to a private address, and translate the source address of a packet sent from a terminal device on the LAN to the WAN from a private address to a global IP address, thereby enabling multiple terminals having only a private address internal to the LAN to share one global IP address to access the WAN. There also have been access control techniques (firewall techniques) which check the destination and the sender of packets from a WAN and allow only the packets that are authorized in accordance with an established security policy to enter a LAN in order to protect the resources within the LAN. Also known are relay apparatuses having an address translating function and an access control function, address translation apparatuses having only an address translation function, and firewall apparatuses having only an access control function.

Some conventional address translation techniques direct access from the Internet to terminal devices on a LAN according to TCP (Transmission Control Protocol) or UDP (User Datagram Protocol) port numbers, thereby enabling the access from the Internet to the terminal devices (see Patent literature 1, for example). However, such address translation apparatuses that direct access from the Internet to terminal devices according to TCP or UDP port numbers can associate only one terminal device with one port number and cannot enable multiple terminal devices to be accessed by using the same port number, because they use TCP or UDP port numbers to enable access from the Internet to terminal devises on a LAN. For example, there is a problem that the http (Hyper Text Transport Protocol) default number 80 cannot be used to publish multiple servers. Also, in the case of communications using protocols other than TCP and UDP that do not have a port number (such as IPsec (Security Architecture for Internet Protocol) and ICMP (Internet Control Message Protocol)), multiple terminal devices cannot be published. For example, an IPsec packet cannot be used by multiple terminal devices at a time because an IPsec packet cannot be set so as to be sent to more than one terminal device. The same holds true with communication from a LAN to the Internet and therefore it is difficult for terminal devices on a LAN to use IPsec packet. To solve the problem, some techniques encapsulate IPsec packets into UDP packets and send it (see Patent literature 2, for example). However, such address translation techniques using encapsulation require that both parties that perform IPsec communication support encapsulation into UDT packets. They do not enable communication with terminals that do not support encapsulation into UDP packets.

On the other hand, some access control techniques enable a security policy established on a firewall apparatus to be modified through access from the Internet by a user identified through authentication (see Patent literature 3, for example). The technique disclosed in Patent literature 3 will be described with reference to FIG. 1. If a user of a user terminal 220 connected to the Internet (WAN) 200 wants to modify an access control rule in an access control table 900*a* in a firewall apparatus 900, the user requests from the user terminal 220 authentication to an authentication server 390 connected with LAN 300. The port number of the authentication sever 390 is recorded in the access control table 900*a* as a condition for permitting any packets to pass through. The authentication request contains the ID (identification information) of the user, signature data of the user and, as information about access to make, the IP address and port number of the user and the IP address and port number of the destination.

The authentication server 900 verifies the authentication request it received. If the request passes the verification, the authentication server 900 requests the firewall apparatus 900 to set, in the access control table 900*a*, the information about access to be made, contained in the authentication request. Consequently, if the request is to access a Web server 310, for example, on the LAN 300 from the user terminal 220, the user is allowed to access the Web server 310 from the user terminal 220 to download a content, for example. The access control table 900*a* in which access permission is set from the outside of the firewall apparatus in this way is reset to its original state after a predetermined time period elapses or the duration of access exceeds a predetermined time period.

Patent literature 1: Japanese Patent Application Laid-Open No. 2002-185517
Patent literature 2: Japanese Patent Application Laid-Open No. 2002-232450
Patent literature 3: Japanese Patent Application Laid-Open No. 2003-132020

DISCLOSURE OF THE INVENTION

Issues to be Solved by the Invention

Conventional address translation techniques can associate only one terminal device with one port number in communication between terminals that do not support encapsulation; They cannot allow more than one terminal to be accessed by using the same port number.

The conventional access control techniques are convenient in that security policies can be dynamically changed. However, after communication for purpose for which it was originally intended ends (for example after the download of a content from a Web server on a LAN ends), the user terminal device that has made an authentication request or another device impersonating that user terminal device can make unauthorized access by taking advantage a setting that is made such that the device is allowed to pass for a predetermined period of time. Thus, the conventional techniques have the problem that they are not capable of ensuring security.

In an address translation technique aspect, an object of the present invention is to provide an address translation technique that enables multiple servers to be published with one identical port number among terminals that do not support encapsulation, and also enables more than one communication to be performed by using a protocol that does not have a port number. In an access control technique aspect, an object of the present invention is to provide an access control technique capable of ensuring security even if a security policy, namely an acceptance condition, is dynamically changed.

Means to Solve Issues

According to the present invention, an access control rule established for each sending device on a global network or for each sending network, and an address translation rule established for each sending device are recorded in a database unit. When a packet is received from the global network, the access from the global network to a private network is restricted in accordance with an access control rule including sender information. A destination address is translated in accordance with an address translation rule including sender information, and then information from the global network is transferred to the private network. When a packet is received from a private network, a source address is translated in accordance with an address translation rule including sender information and then information from the private network is transferred to the global network.

For an access request from the global network, authentication is performed if an access control rule or address translation rule between the sender and the destination with which the sender wants to communicate is added to or deleted from a database unit. If such authentication is successful, an access control rule on a per sending device basis or on a per sending network basis is established and an address translation rule on a per sending device basis is established, and these rules are stored in the database unit. The added access control rule and address translation rule are removed from the database unit after the communication ends.

For an access request from a private network, if the database unit does not contain an access control rule and address translation rule between the sender and the destination with which the sender wants to communicate, an access control rule and address translation rule on a per sender basis are established and are stored in the database unit. On the completion of communication, the added access control rule and address translation rule are removed from the database unit.

The authentication may be performed in an authentication unit in a relay apparatus. Alternatively, an authentication server may be provided in the global network and only the authentication server may request the relay apparatus to add an access control rule (set an acceptance condition in a firewall apparatus).

By applying the method to address translation rules only, an address translation method is provided; by applying the method to access control rules only, a firewall method is provided. For the firewall technique, the communication status of a secure session is notified to the requester through the secure session in the duration of the secure session.

Effects of the Invention

According to the present invention, different access control rules and address translation rules can be applied to packets having different source addresses. Accordingly, multiple severs on a private network can be made open to the public by using the same port number and multiple terminals on a private network can perform communication at the same time by using a protocol having no port number.

When a packet is received from a terminal on a private network, an access control rule and an address translation rule for the packet are added if an access control rule and address translation rule are not registered for the packet. Thus, an access control rule and an address translation rule for communication initiated from a terminal on a private network can be registered automatically and communication can be performed without registering an access control rule and address translation rule beforehand.

According to the access control technique, a condition for passing a firewall apparatus can be dynamically changed from the outside of the firewall apparatus so that packets from an appropriate user can pass through the firewall apparatus. In addition, when the secure session is disconnected, the pass permission (access control rule) is removed. Accordingly, once the session is disconnected, unauthorized packets cannot pass through the firewall apparatus. Furthermore, if the communication status of an established session is to be notified to the requester, the requester can monitor for unauthorized communication.

If requests are accepted only from a predetermined server to make settings for a firewall apparatus or to change address translation rules, access control or address translation rule settings can be changed from a global network while preventing the presence of the device and provision of services from being detected through port scanning.

BRIEF DESCRIPTION OF THE DRAWINGS

FIG. 3 is a diagram showing an initial state of an access control table according to the first embodiment;

FIG. 4 is a diagram showing an initial state of an address translation table in the first embodiment;

FIG. 6 shows the access control table after an access control rule is added in the first embodiment;

FIG. 7 shows the address translation table after an address translation rule is added in the first embodiment;

FIG. 10 is a diagram showing an access control rule to be added to the first relay apparatus in the second embodiment;

FIG. 11 is a diagram showing an address translation rule to be added to the first relay apparatus in the second embodiment;

FIG. 12 is a diagram showing an address translation rule to be added to the second relay apparatus in the second embodiment;

FIG. 13 is a diagram showing an access control rule to be added to the second relay apparatus in the second embodiment;

FIG. 15 is a diagram showing an initial state of an access control table in the third embodiment;

FIG. 16 is a diagram showing an initial state of an address translation table in the third embodiment;

FIG. 19 is a diagram showing an access control rule which the authentication server requests to be added in the third embodiment;

FIG. 20 is a diagram showing an address translation rule which the authentication server requests to be added in the third embodiment;

FIG. 21 is the access control table after the access control rule is added in the third embodiment;

FIG. 22 is a diagram showing the address translation table after the address translation rule is added in the third embodiment;

FIG. 23 is a diagram showing an exemplary functional configuration of an address translation apparatus according to a fourth embodiment;

FIG. 24 is a diagram showing an initial state of an address translation table in the fourth embodiment;

FIG. 25 is a diagram showing the address translation table after an address translation rule is added in the fourth embodiment;

FIG. 30 is a diagram showing an initial state of an access control table (acceptance condition table) in a fifth embodiment;

FIG. 31 is a diagram showing the access control table (acceptance condition table) after an access control rule (acceptance condition) is added in the fifth embodiment;

FIG. 32 is a diagram showing an access control table (acceptance condition table) after an access control rule (acceptance condition) is added in a sixth embodiment;

FIG. 33 is a diagram showing an access control table (acceptance condition table) after an access control rule (acceptance condition) is added.

BEST MODES FOR CARRYING OUT THE INVENTION

Figure 1:
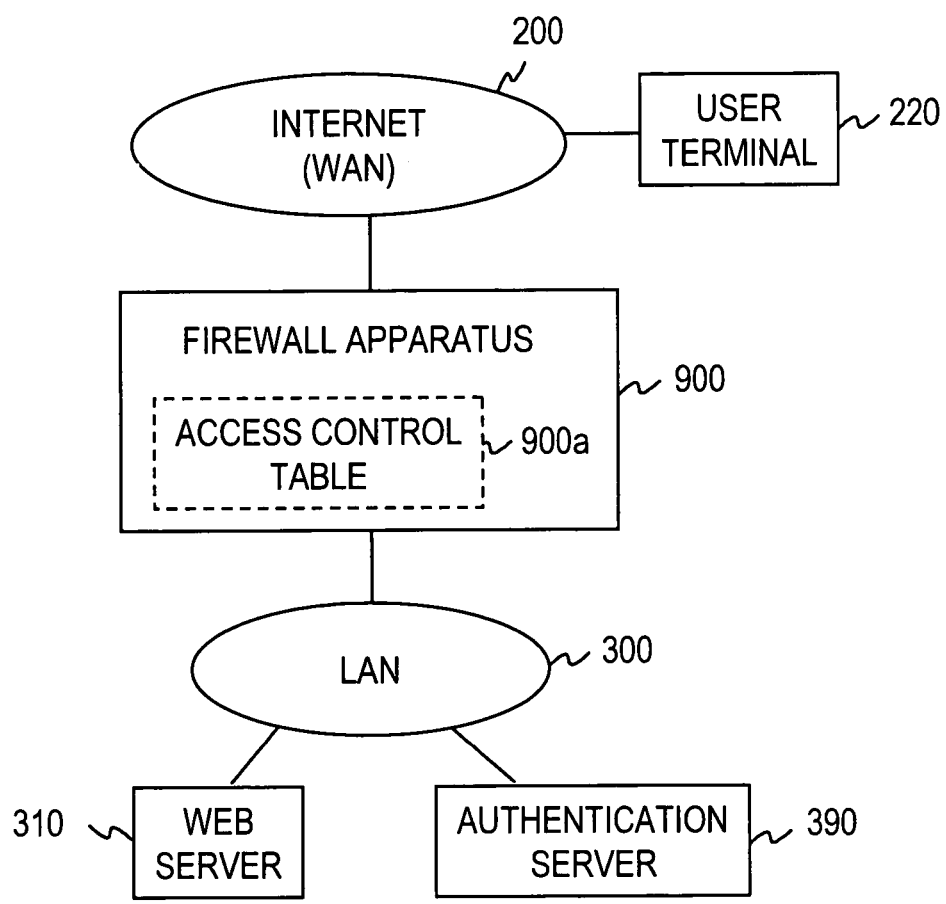
FIG. 1 is a diagram for illustrating a system configuration of a conventional firewall apparatus.

Embodiments of the present invention will be described with reference to the accompanying drawings, in which like components are labeled like reference numerals to avoid repeated description.

First Embodiment

Figure 2:
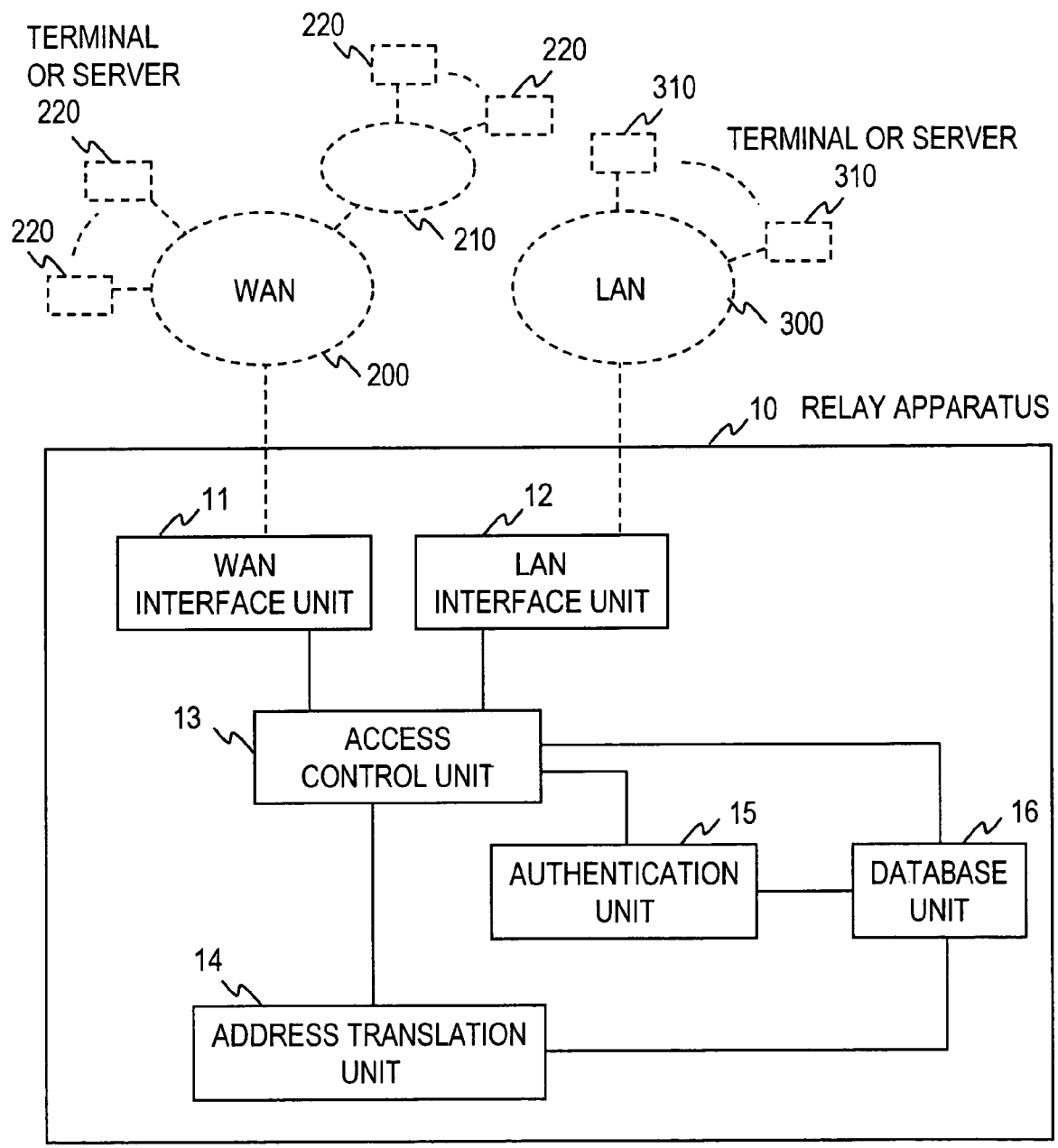
FIG. 2 is a diagram showing an exemplary functional configuration of a relay apparatus according to a first embodiment.

FIG. 2 shows an exemplary functional configuration of a relay apparatus 10 in a first embodiment.

In FIG. 2, the relay apparatus 10 in the first embodiment includes a WAN interface unit 11 which sends and receives packets to and from a wide area network (WAN) 200 such as Internet, a LAN interface unit 12 which sends and receives packets to and from a LAN 300, an access control unit 13 which analyzes packets received by the WAN interface unit 11 and the LAN interface unit 12 and controls access, an address translation unit 14 which analyzes packets permitted by the access control unit 13 to pass and packets transmitted from inside LAN to WAN and performs address translation, an authentication unit 15 which performs authentication of a user in response to a request from the access control unit 13, and a database unit 16 storing data for access control, data for address translation, and data concerning authentication.

The relay apparatus 10 has an access control function (firewall function). The access control unit 13 determines whether or not a packet received at the WAN interface unit 11 should be sent to the LAN through the LAN interface unit 12, on the basis of an access control table as shown in FIG. 3, stored in the database unit 16.

The column "Source IP address" in FIG. 3 indicates the source IP address of a packet received at the WAN interface unit 11; the column "Protocol/Source port number" indicates the name of the protocol of a packet received at the WAN interface unit 11 and, if the protocol uses a port number, the source port number; the column "Destination IP address" indicates the destination IP address of a packet received at the WAN interface unit 11; the column "Protocol/Destination port number" indicates the name of the protocol of a packet received at the WAN interface unit 11 and, if the protocol uses a port number, the destination port number; the column "Action" indicates an action that is performed on a packet received at the WAN interface unit 11 if the source and the destination of the packet matches the values in the relevant row.

A preset protocol name or a protocol name associated with a port number may be used as the protocol names used in the columns "Protocol/Source port number" and "Protocol/Destination port number".

For example, the first row in FIG. 3 indicates that packets with the destination IP address "111.111.111.2" and the protocol name "http (HyperText Transport Protocol, for example TCP (Transmission Control Protocol) 80", are to be sent to the LAN (Accept), regardless of their source IP address and port number.

Similarly, the second row in FIG. 3 indicates that packets with the source IP address "123.123.123.1", the destination IP address "111.111.11.2", and the protocol name "SSH (Secure Shell, for example TCP 22)" are sent to the LAN. The third row indicates that all packets are dropped (Drop).

The access control unit 13 checks a table like this, starting from the top row, for a mach with a received packet and, if there is a match, performs a specified action, and then ends the process concerning the packet. That is, the conditions set in upper rows in the table in FIG. 3 are given higher priorities.

The relay apparatus 10 has recorded an address translation tables as shown in FIG. 4 in the database unit 16. On the basis of this address translation table, the address translation unit 14 translates the destination IP address of a packet received at the WAN interface unit 11 and passed by the access control unit 13 into an IP address internal to the LAN and sends the IP address to the LAN through the LAN interface unit 12.

It also translates the source IP address of a packet received at the LAN interface unit 12 to a WAN IP address (global address) and outputs it to the access control unit 13. The access control unit 13 sends an accepted packet to the WAN through the WAN interface unit 11.

In FIG. 4, the column "Source IP address" indicates the source IP address of a packet received at the WAN interface unit 11; the column "Destination IP address" indicates the destination IP address of a packet received at the WAN interface unit 11; and the column "Protocol/Destination port number" indicates the protocol name of a packet received at the WAN interface unit 11 and, if the protocol uses a port number, the port number. The column "Internal IP address" indicates the LAN private address, which is set as the destination IP address of a packet received at the WAN interface unit 11 if the source and destination of the packet matches their respective values in the relevant row. The column "Protocol and port number" indicates a port number, which is set as the destination port number of a packet if the source and destination of the packet received at the WAN interface 11 match their respective values in the relevant row. If "any" is indicated, any address may be contained.

For example, the first row in FIG. 4 indicates that a packet with the destination IP address "111.111.111.2" and the destination port number "TCP 80 (http)" is sent to the LAN regardless of its source IP address, with the destination IP address being changed to "192.168.100.5" and the destination port number being unchanged.

The second row in FIG. 4 indicates that a packet with the source IP address "123.123.123.1", the destination IP address "111.111.111.2", and the destination port number "TCP 22 (SSH)" is sent to the LAN, with the destination IP address being changed to "192.168.100.5" and the destination port number being unchanged.

By making settings in this way, access from the WAN to a particular port or access to a destination that uses a protocol having no port number can be delivered to a terminal on the LAN.

The address translation unit 14 searches through the address translation table as shown in FIG. 4, starting from the top row, and, if it finds a mach with a received packet, performs a specified action, and then ends the process concerning the packet. That is, the conditions set in upper rows in the table in FIG. 4 are given higher priorities.

FIG. 4 shows the initial state (a state in which no terminal is performing communication) of the address translation table. In response to a communication request from a terminal in a LAN or a request from a terminal of the WAN, the relay apparatus 10 adds an access control rule to the access control table in FIG. 3 and adds an address translation rule to the address translation table in FIG. 4.

Figure 5:
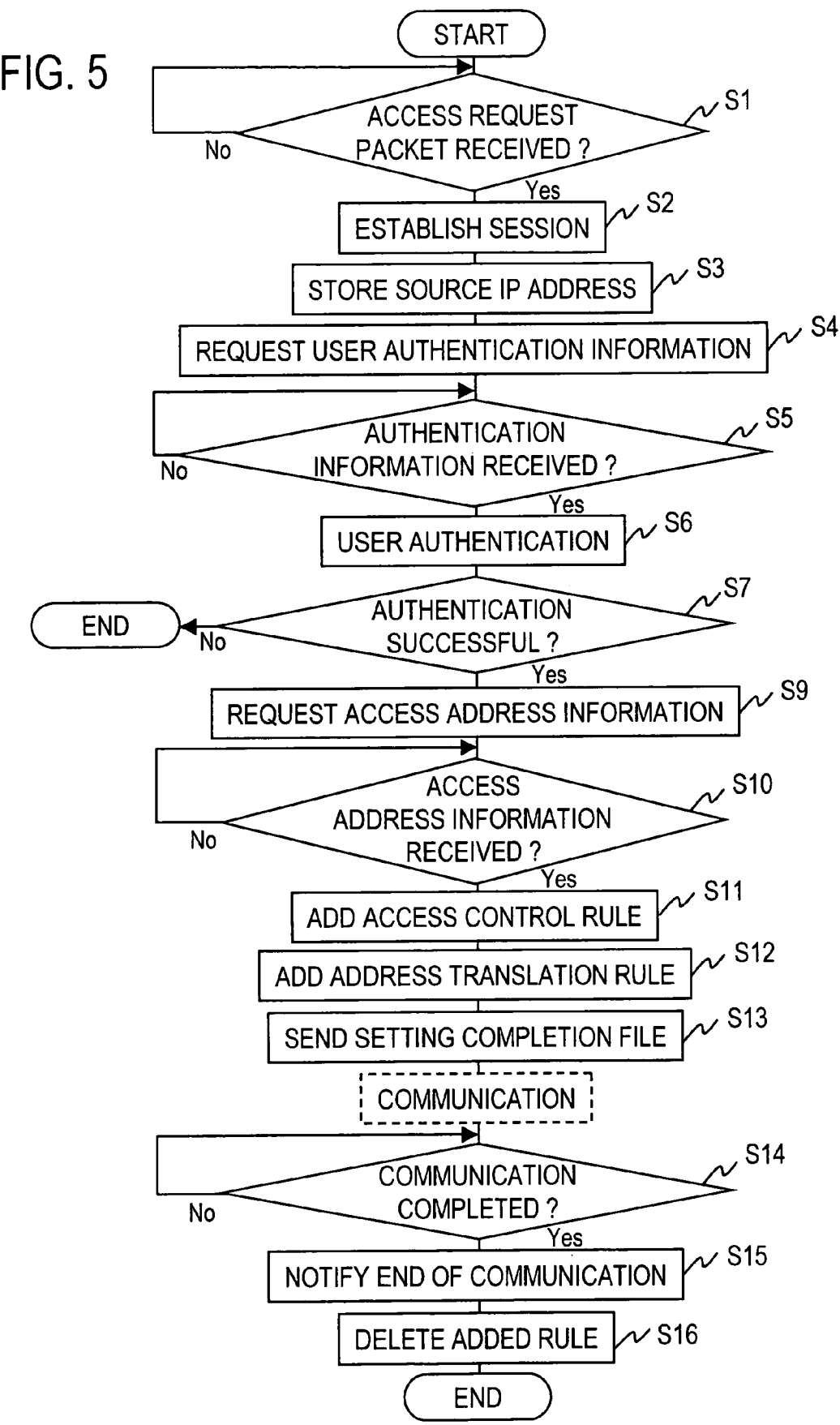
FIG. 5 is a diagram showing a process flow according to the first embodiment.

This process will be described in detail with reference to FIG. 5. When the access control unit 13 receives an https (HyperText Transfer Protocol Security) access request packet directed to the global address of the relay apparatus 10 through the WAN interface unit 11 (step S1), the access control unit 13 established an SSL (Secure Socket Layer) session with the sending terminal. If the session is established successfully, the access control unit 13 stores the IP address of the sending terminal, which is obtained during establishing the session (step S3). Then, the access control unit 13 encrypts an HTML file for entering identification information and a password of a user and sends it to the requesting terminal through the WAN interface unit 11 in order for authentication of the user (step S4).

The access control unit 13 receives encrypted identification information and password of the user (step S5) from the requesting terminal. Then, the access control unit 13 decrypts the identification information and password of the user and sends them to the authentication unit 15 to request authentication of the user.

When the authentication unit 15 receives the identification information and password of the user, the authentication unit 15 searches through user information stored in the database unit 16 for a user having identification information that matches the received user identification information. If a matching user is found, the password of the user stored is compared with the received password (step S6). If the passwords mach each other, the authentication unit 15 sends an authentication success to the access control unit 13. If no matching user is found or the passwords do not match, the authentication unit 15 sends an authentication failure to the access control unit 13 (step S7).

When the access control unit 13 receives the authentication success from the authentication unit 15, the access control unit 13 encrypts an HTML file for entering the intra-LAN private address, protocol, and port number of a server to which the user wants to access, and sends the encrypted HTML file to the requesting terminal through the WAN interface unit 11 (step S9).

The access control unit 13 receives an encrypted private address, protocol, and port number from the requesting terminal (step S10). The access control unit 13 then decrypts them and adds, to the access control table in the database unit 16 an access control rule, in which the stored source IP address of the https access request packet is set as the "Source IP address 11 and the received protocol and port umber as the "Protocol/Destination port number" (step S11). The access control unit 13 also sends the source IP address of the https access request packets, and the received private address, protocol, and port number to the address translation unit 14 to request it to add an address translation rule. The address translation unit 14 receives the request for adding an address translation rule and adds, to the address translation table in the database unit 16, an address translation rule, in which the source IP address of the https access request packet is set as the "Source IP address", the received private address as the "Internal IP address", the protocol and port number as the "protocol/destination port number". (step S12).

For example, if the destination IP address of an https access request packet having the destination IP address "111.111.111.2" and the destination port number "TCP 22" is to be replaced with the internal IP address "192.168.100.4" in response to a packet from a terminal having the source IP address "111.222.234.123", then an access control rule for the terminal that has accessed using https is added as the top column of the access control table in FIG. 3, as shown in FIG. 6. Furthermore, an address translation rule for the terminal that has accessed using https is added at the top column of the address translation table in FIG. 4 as shown in FIG. 7.

With these rules, packets with the source IP address "111.222.234.123", the destination IP address "111.111.111.2", and the destination port number "TCP 22" will pass the access control unit 13. The destination IP address will be changed to "192.168.100.4" in the address translation unit 14, then the packets will be sent to the LAN. Other packets whose source IP address contains the destination port number "TCP 22" will be dropped by the access control unit 13.

Then the access control unit 13 encrypts an HTML file that displays information indicating that authentication has succeeded and the address translation rule has been set, and the translated private address internal to the LAN, the protocol, the port number, and other information, and sends the HTML file to the terminal (step S13). A program is embedded in the HTML file for the terminal to access the relay apparatus 10 at predetermined time intervals.

In the terminal, the sent HTML file is decrypted and displayed so that the address translation information can be checked. The program embedded in the HTML file causes the terminal to start sending a signal to the relay apparatus 10 at the predetermined time intervals.

The access control rule and the address translation rule are set in this way and communication with the terminal in the LAN is performed. When the user wants to end the communication, the user selects a communication end button on a screen displayed by the HTML file received from the relay apparatus 10, or closes the browser displaying the HTML file, or shuts down (by powering off or by logging off or by performing other action on) the terminal displaying the HTML file.

When the access control unit 13 of the relay apparatus 10 receives a communication end packet, or detects that the browser has been closed or the terminal has been shut down because the access control unit 13 has received no signal from the terminal for a predetermined period of time (step S14), the access control unit 13 restores the table changed as shown in FIG. 6 to the original state shown in FIG. 3, sends the source IP address, destination IP address, and protocol to the address translation unit 14 and notifies that the communication has ended (step S15). The address translation unit 14 receives the notification of the end of communication and restores the table changed as shown in FIG. 7 to the original state shown in FIG. 4 (step S16).

As has been described, according to the present embodiment, an access control rule and an address translation rule using a source IP address are set in an access control table and address translation table, respectively. Therefore, even packets that contain destinations having the same port number can be delivered to different servers according to their source IP addresses, or even communication using a protocol having no port number can be provided to different terminals according to the source IP addresses.

While the addition of an access control rule and address translation rule using a source IP address is accepted through access using https in the present embodiment, any of http, SIP (Session Initiation Protocol), SSH, and telnet may be used.

Second Embodiment

Figure 8:
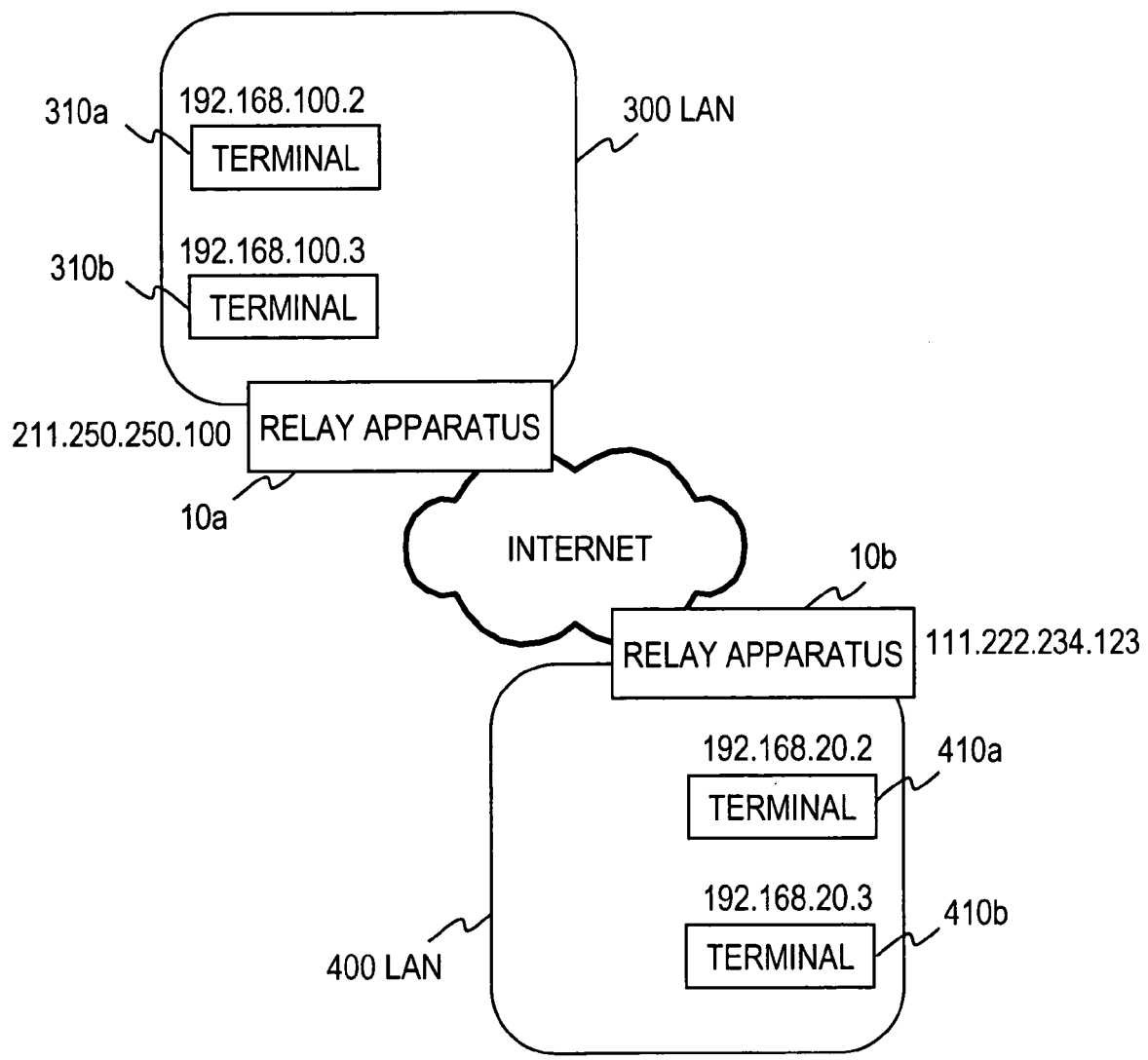
FIG. 8 is a diagram showing a configuration including a first and second relay apparatuses capable of communicating through the Internet, and a LAN and terminals connected to them.
Figure 9:
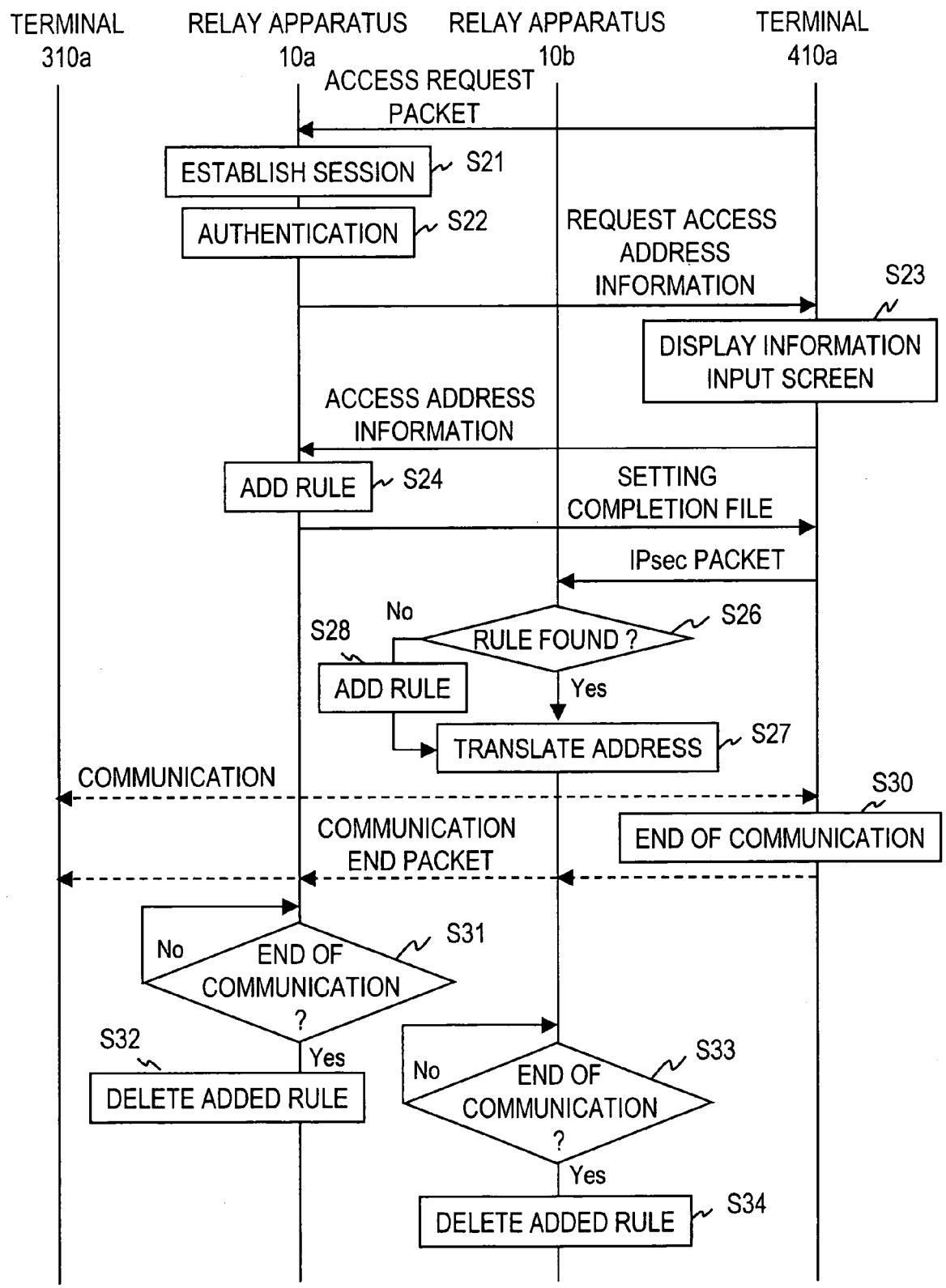
FIG. 9 is diagram showing a process flow according to a second embodiment.

The relay apparatus 10 described in the first embodiment enables multiple terminals on a LAN (private network) to perform IPsec communication through the relay apparatus 10, by adding an address translation rule for translation of a destination IP address and a source IP address (the private network is the source) to an address translation table when the relay apparatus 10 has received the first packet of the IPsec communication from the LAN. FIG. 8 shows a configuration including a first relay apparatus 10a and a second relay apparatus 10b, which can communicate with each other through the Internet, and LANs connected to them, and terminals. IPsec communication between a terminal on LAN 300 and a terminal on LAN 400 will be described below with reference to FIG. 9.

First, a terminal 410a sends an https access request packet to the first relay apparatus 10a in order to add an address translation rule required for IPsec communication with a terminal 310a on LAN 300 to the first relay apparatus 10a.

The first relay apparatus 10a receives the https access request packet, establishes an SSL session with the source terminal (step S21), performs authentication of the user (step S22) and, if the user is successfully authenticated, sends to the requesting terminal 410a an HTML file for entering the intra-LAN private address, protocol, and port number of a server to which the user wants to access. A program is embedded in the HTML file for the terminal to access the relay apparatus 10 at predetermined time intervals.

The terminal 410a displays the received HTML file it received (step S23) to prompt the user to enter information about the access destination. In this case, the user inputs the private IP address 192.168.100.2 of the terminal 310a to which the user wants to access and IPsec as its protocol. The terminal 410a sends the inputted private IP address and protocol to the first relay apparatus 10a.

The first relay apparatus 10a receives the private IP address and protocol and adds an access control rule as shown in FIG. 10 in which the source IP address of the https access request packet (the IP address 111.222.234.123 of the second relay apparatus 10b), which is recorded in a database unit 16, is specified as the "Source IP address", IPsec as the "Protocol/Source port number", the global address 211.250.250.100 of the first relay apparatus 10a as the "Destination IP address", and IPsec as the "Protocol/Destination Port number". The first relay apparatus 10a also adds an address translation rule shown in FIG. 11 in which the source IP address of the http access request packet is specified as the "Source IP address", the global address 211.250.250.100 of the first relay apparatus 10a as the "Destination IP address", and IPsec as the "Protocol/Destination Port number", and 192.168.100.2 as the "Internal IP address" (step S24).

When the terminal 410a sends the first IPsec packet to the second relay apparatus 10b, the address translation unit 14 of the second relay apparatus 10b checks an address translation table to see if an address translation rule concerning the IPsec communication is registered in the address translation table. Specifically, the address translation unit 14 searches the address translation table for an address translation rule containing the source IP address that matches the destination IP address of the packet and the internal IP address that matches the source IP address of the packet (step S26).

If an address translation rule that satisfies this condition is found, the source IP address is changed to the destination address in the address translation rule (step S27), and the changed packet is sent through the access control unit 13.

If an address translation rule that satisfies the condition is not found, an address translation rule shown in FIG. 12 is added, in which the destination IP is set as the "Source IP address", the IP address of the second relay apparatus 10b (in this case, 111.222.234.123) as the "Destination IP address", IPsec as the "Protocol/Destination port number", and the source IP address (in this case, 192.168.20.2) as the "Internal IP address". Furthermore, the address translation unit 14 requests the access control unit 13 to add an access control rule that permits IPsec packets having the source IP address 211.250.250.100 and the destination IP address 111.222.234.123 to pass. The access control unit 13 adds the access control rule shown in FIG. 13.

After the access control unit 13 adds the access control rule, the address translation unit 14 changes the source IP address of a received packet to the global IP address of the second relay apparatus 10b (in this case, 111.222.234.123) and sends out the packet with the changed address through the access control unit 13. Subsequently, communication using IPsec is performed between the terminals 310a and 410a.

After the communication using IPsec ends, the user of terminal 410a selects a communication end button on a screen displayed by an HTML file received from the first relay apparatus 10a, or closes the browser displaying the HTML file, or shut down the terminal displaying the HTML file (step S30).

When the access control unit 13 of the first relay apparatus 10a detects the reception of a communication end packet, or detects that the browser has been closed or the terminal has been shut down because the access control unit 13 has received no signal from the terminal 410a for a predetermined period of time (step S31), the access control unit 13 deletes the access control rule shown in FIG. 10. The access control unit 13 also notifies the address translation unit 14 that the communication using the source IP address 111.222.234.123, the destination IP address 211.250.250.100, and the protocol IPsec has ended. The address translation unit 14 receives the notification of the end of communication and deletes the address translation rule shown in FIG. 11 (step S32).

When the access control unit 13 of the second relay apparatus 10b detects the reception of a communication end packet, or detects that the browser has been closed or the terminal 410a has been shut down because the access control unit 13 has received no signal from the terminal 410a for a predetermined period of time (step S33), the access control unit 13 deletes the access control rule shown in FIG. 13. The access control unit 13 also notifies the address translation unit 14 that the communication using the source IP address 211.250.250.100, the destination IP address 111.222.234.123, and the protocol IPsec has ended. The address translation unit 14 receives the notification of the end of communication and deletes the address translation rule shown in FIG. 12 (step S34).

As has been described above, according to this embodiment, an access control rule and an address translation rule using a source IP address are set in an access control table and an address translation table, respectively. Therefore, even packets that contain destinations having the same port number can be delivered to different servers according to different source IP addresses, or even communication using a protocol having no port number can be provided to different terminals according to different source IP addresses.

Furthermore, even if an address translation rule for the destination IP address and source IP address of an IPsec packet received from a LAN is not registered, an address translation rule for IPsec communication initiated by a terminal on the LAN can be automatically registered. Therefore, IPsec communication can be performed without registering an address translation rule beforehand.

While an address translation rule and access control rule are added by using the first packet of IPsec communication, an access control rule and address translation rule may be added by using the first packet of IKE (Internet Key Exchange) communication or the like.

Third Embodiment

While authentication of a terminal on the WAN is performed by the authentication unit 15 in a relay unit 10 in the first and second embodiments, access may be passed to an authentication server on the WAN, authentication may be performed on the authentication server, and an access control rule and an address translation rule may be added or deleted in response to a request sent from the authentication server. This enables communication from the WAN by stealth (the accessible protocol and port number can be hidden).

Figure 14:
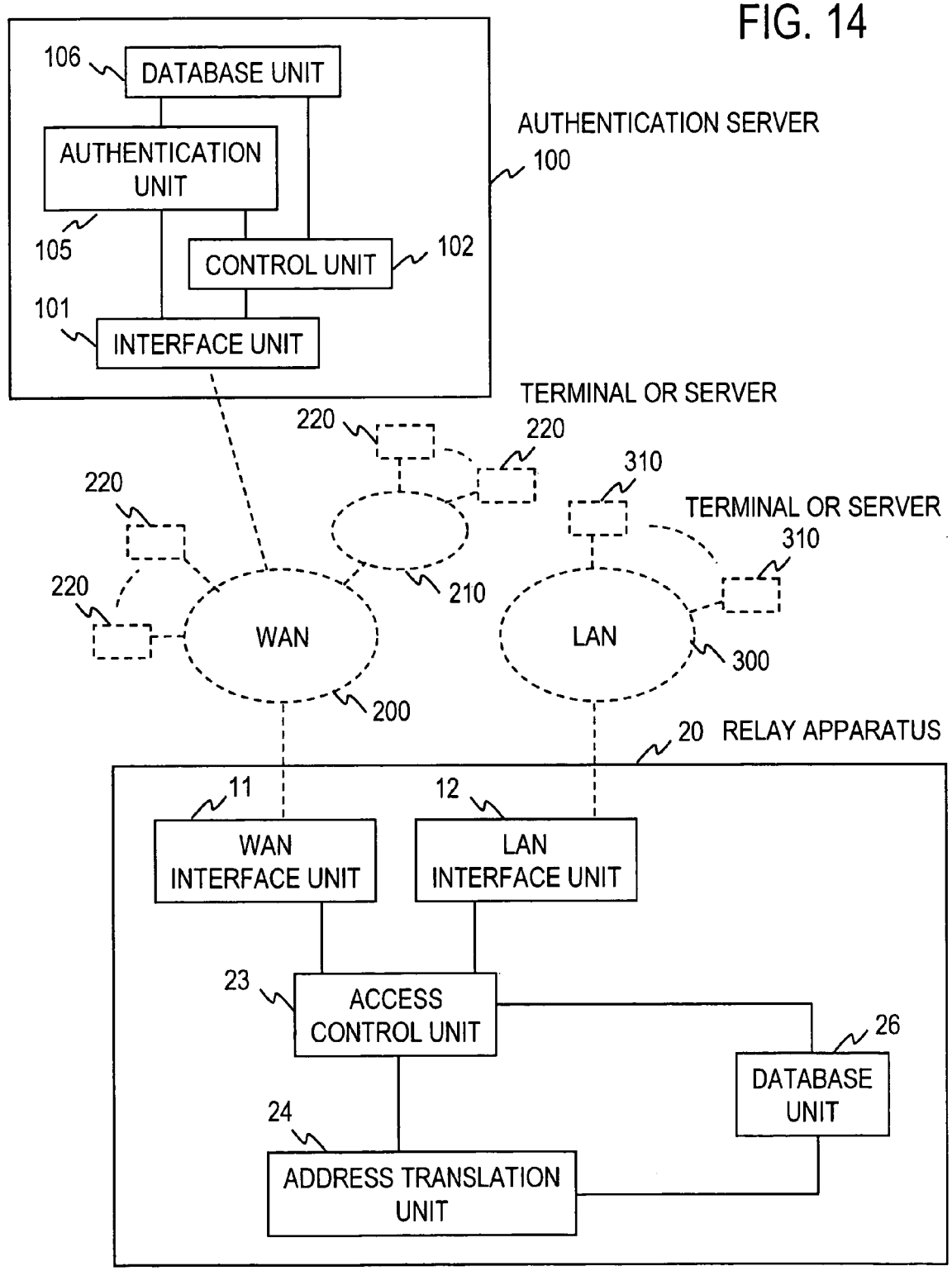
FIG. 14 is a diagram showing an exemplary functional configuration of a relay apparatus in a case where an authentication server on a WAN is used according to a third embodiment.

FIG. 14 is a diagram showing an exemplary functional configuration of a relay apparatus in a case where an authentication server on a WAN is used. The relay apparatus 20 in FIG. 14 is connected to a wide area network (WAN), such as the Internet, and includes a WAN interface unit 11 for sending and receiving packets to and from the WAN, a LAN interface unit 12 for sending and receiving packets to and from the LAN, an access control unit 23 which analyzes packets received at the WAN interface unit 11 and the LAN interface unit 12 to perform access control, an address translation unit 24 which translates the destination address of packets sent from the WAN to the LAN and the source address of packets sent from the LAN to the WAN, and a database unit 26 which stores data for access control and data for address translation. An authentication server 100 is provided on the WAN which performs authentication of a terminal on the WAN and requests the relay apparatus 20 to add an access control rule.

The authentication server 100 includes an interface unit 101 for providing communication with terminals on the WAN and the relay apparatus 20, a control unit 102 for controlling the authentication server 100, an authentication unit 10s which performs authentication, and a database unit 106 which records authentication information and in-progress communication information.

The relay apparatus 20 has a firewall function. In particular, the access control unit 23 determines whether a packet received from the WAN should be sent to the LAN, on the basis of an access control table shown in FIG. 15 which is stored in the database unit 26.

In FIG. 15, the column "Source IP address" indicates the source IP address of a packet received at the WAN interface unit 11; the column "Source port number" indicates the source port number of a packet received at the WAN interface unit 11; the column "Destination IP address" indicates the destination IP address of a packet received at the WAN interface unit 11; the column "Protocol/Destination port number" indicates the protocol name and, if the protocol uses a port number, the port number of a packet received at the WAN interface unit 11; the column "Action" indicates an action to be performed on a packet received at the WAN interface unit 11 if the source and destination of the packet match their respective values in the relevant row.

A preset protocol name or a protocol name associated with a port number may be used as the protocol name used in the column "Protocol/Destination port number".

For example, the first row in FIG. 15 indicates that a packets with destination IP address "123.123.123.123" and the protocol name "https (HyperText Transfer Protocol Security, for example TCP 443) is sent to the LAN (Accept), regardless of its source IP address and port number.

Similarly, the second row in FIG. 15 indicates that a packet with the source IP address "211.250.250.100", the destination IP address "123.123.123.123", and the protocol name "SSH (Secure Shell, for example TCP 22) is sent to the LAN. The third row indicates that all packets are dropped (Drop).

The access control unit 23 checks the table, starting from the top row, to see if there is a match and, if there is a match, performs a specified action, then ends the process concerning the packets. That is, the conditions set in upper rows in the table in FIG. 15 are given higher priorities.

The relay apparatus 20 has stored an address translation table as shown in FIG. 16 in the database unit 26. Based on this table, the address translation unit 24 translates the destination IP address of a packet received from the WAN into an IP address internal to the LAN and sends the IP address to the LAN. The address translation unit 24 also translates the source IP address of a packet received from the LAN into a WAN IP address (global address) and sends it to the WAN.

In FIG. 16, the column "Source IP address" indicates the source IP address of a packet received at the WAN interface unit 11; the column "Destination IP address" indicates the destination IP address of a packet received at the WAN interface unit 11; the column "Protocol/Destination port number" indicates the protocol name of a packet received at the WAN interface unit 11 and, if the protocol uses a port number, the port number of the packet; the column "Internal IP address" indicates a LAN private address, which is set as the destination IP address of a packet received at the WAN interface unit 11 if the source and the destination of the packet match their respective values in the relevant row, and the column "Protocol and port number" indicate a port number, which is set as the destination port number of a packet received at the WAN interface unit 11 if the source and destination of the packet match their respective values in the relevant row.

For example, the first row in FIG. 16 indicates that a packet with the destination IP address "123.123.123.123" and the destination port number "TCP 443 (https)" is sent to the LAN regardless of its source IP address, with its destination IP address being changed to "192.168.100.5" and its destination port number being unchanged.

Similarly, the second row in FIG. 16 indicates that a packet with the source IP address "211.250.250.100", the destination IP address "123.123.123.123", and the destination pot number "TCP 22 (SSH)" is sent to the LAN, with its destination IP address being changed to "192.168.100.5" and its destination port number being unchanged.

By making settings in this way, access from the WAN to a particular port, or access to a protocol having no port, can be delivered to a terminal on the LAN.

The address translation unit 24 checks such a table for a match with a received packet, starting from the top row, and if finding a match, performs a specified action, and then ends the process concerning the packet. That is, the conditions set in upper rows in the table in FIG. 16 are given higher priorities.

The state shown in FIG. 16 is the initial state (a state in which no terminal is performing communication). In response to a communication request from a terminal in a LAN or a request from a server on the WAN, which will be described later, an address translation rule is added, and the addresses of packets sent from the LAN to the WAN and the address of packets sent from the WAN to the LAN are translated according to the table in FIG. 16 and are then sent.

Figure 17:
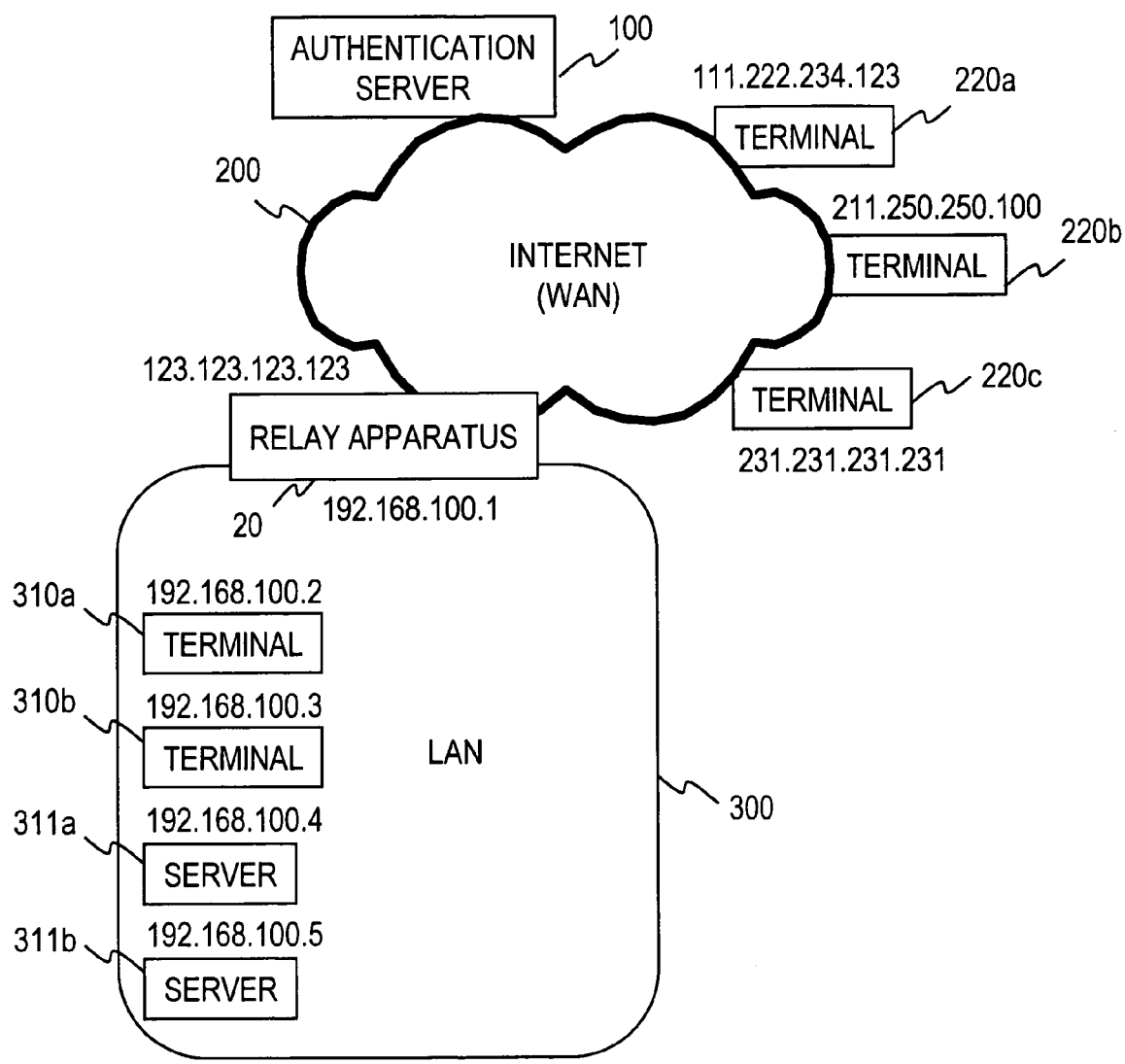
FIG. 17 is a diagram showing a configuration including an authentication server and terminals on the Internet and terminals and servers on a LAN in the third embodiment.

FIG. 17 shows a configuration including an authentication sever and terminals on the Internet and terminals and servers on a LAN. A relay apparatus 20 is connected onto the LAN 300 to which terminals 310a, 310b, and severs 311a, 311b are connected. The relay apparatus 20 can add an access control rule to the access control table shown in FIG. 15 and an address translation rule to the address translation table shown in FIG. 16 only in response to a request from the authentication server 100 on the Internet 200.

The authentication server 100 stores, in a database unit 106, authentication information for authenticating users who are allowed to access the relay apparatus 20, an address of the relay apparatus 20, access to which is permitted on a user-by-user basis, and access information such as access control rules and address translation rules to be added. In response to a request from a terminal on the Internet 200, the authentication server 100 performs authentication of a user on the basis of authentication information stored in the database unit 106. If the authentication is successful, the authentication server 100 requests the relay apparatus to add an access control rule and an address translation rule.

Figure 18:
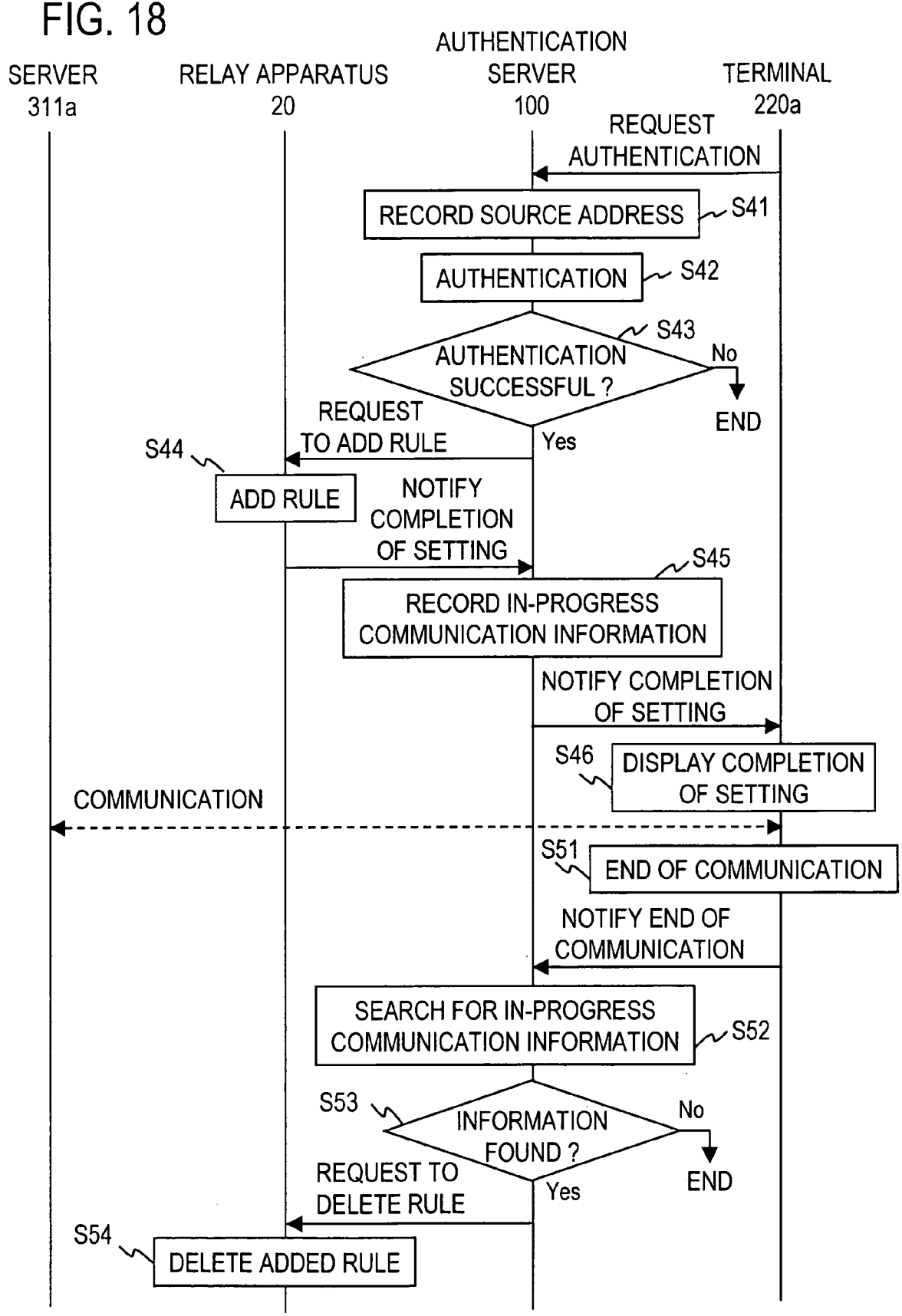
FIG. 18 is a diagram showing a process flow according to the third embodiment.

An example will be described by using FIG. 18 in which communication between a terminal 220a on the Internet 200 and a server 311a is to be performed. A user operating the terminal 220a connects to the authentication server 100 on the Internet 200 and undergoes authentication. The authentication may be simple authentication using identification information (ID) and a password or authentication using a sophisticated software function based on a one-time password or biometric information. Information used for such authentication is preferably encrypted before being sent, in order to prevent leak of information over the Internet.

In response to a request for authentication, the authentication server 100 stores the address of the terminal 220a requesting authentication as the source address of the terminal 220a (step S41) and performs authentication of the user on the basis of authentication information (step S42).

If the authentication of the user is successful (step S43), the authentication server 100 requests the relay apparatus 20 to add an access control rule and an address translation rule in which the stored address of the terminal 220a is set as the source address. For example, if the authentication server 100 is to permit only http access from the terminal 220a to the server 311a, the authentication server 100 requests to add an access control rule which uses the address of the terminal 220a (111.222.234.123) as the source, shown in FIG. 19, and to add an address translation rule which changes the destination of a http packet whose source is the address of the terminal 220a (111.222.234.123) to the address of the server 311a (192.168.100.4), shown in FIG. 20.

When the access control unit 23 of the relay apparatus 20 receives the request for adding the access control rule and the request for adding the address translation rule from the authentication server 100, the access control unit 23 adds the received access control rule to an access control table in the database unit 26. The access control unit 23 requests the address translation unit 24 to add the address translation rule received from the authentication server 100. The address translation unit 24 receives the request for adding the address translation rule from the access control unit 23 and adds the received address translation rule to an address translation table in the database unit 26 (step S44). For example, if the http access from the terminal 220a to the server 311a is to be permitted, the access control rule in FIG. 19 is added to the access control table in FIG. 15 to set the access control table as shown in FIG. 21. Furthermore, the address translation rule shown in FIG. 20 is added to the address translation table in FIG. 16 to set the address translation table as shown in FIG. 22.

On the completion of addition of the access control rule and address translation rule, the access control unit 23 sends notification of the completion of addition back to the authentication server 100.

When the authentication server 100 receives the notification of the completion of addition from the relay apparatus 20, the authentication server 100 associates the stored addresses of the terminal 220a and the relay apparatus 20 with the added access control rule and address translation rule and stores them as in-progress communication information (step S45). The authentication server 100 sends notification that the access had been permitted, and the name of a service (which may be the IP address and port number of the service, for example a Web camera) to which access is permitted as accessible information.

The terminal 220a notifies the user that the access has been permitted and indicates accessible information by displaying the received information (step S46).

In this way, http access from the terminal 220a is delivered to the server 311a and http access from other terminals is rejected. The user recognizes that the access has been permitted and starts communication with a terminal or a server on the LAN 300.

When the user wants to end communication after performing the communication with a terminal or server on the LAN 300, the user inputs end information from the terminal 220a (step S51) to notify the authentication server 100 of the end of communication.

When the authentication server 100 receives the notification of the end of communication, the authentication server 100 searches the in-progress information for an address on the terminal side that matches the address of the sender of the notification of the end of communication (step S52). If the authentication server 100 finds a match in the in-progress communication information (step S53), the authentication server 100 requests the associated relay apparatus 20 to delete the associated access control rule and address translation rule.

When the access control unit 23 of the relay apparatus 20 receives the request for deleting the access control rule and address translation rule, it deletes the received access control rule from the access control table in the database unit 26. Also, the access control unit 23 requests the address translation unit 24 to delete the address translation rule received from the authentication server 100. The address translation unit 24 receives the request for deleting the address translation rule from the access control unit 23 and deletes the relevant address translation rule from the address translation table in the database unit 26 (step S54).

In this way, the access control table in the relay apparatus 20 is restored to the state shown in FIG. 15 and the address translation table is restored to the state shown in FIG. 16 in response to the notification of the end of communication from the user. Consequently, unauthorized access using the added access control rule and address translation rule can be prevented.

Furthermore, an access control rule and address translation rule can be changed while preventing a port from being detected through port scan, because the relay apparatus 20 receives a request for adding or deleting the access control rule and address translation rule only from the authentication server 100.

Moreover, because authentication is performed in the authentication server 100, various types of authentication, ranging from authentication using an ID and password to more sophisticated authentication, can be readily performed.

While the access control rule and address translation rule have been deleted in response to notification of the end of communication provided from the terminal 220a, the access control rule and address translation rule may be deleted after no packets have been sent or received for a predetermined period of time or after a predetermined time period has elapsed since the start of the communication.

Furthermore, the authentication server 100 may serve as an http server so that reception of authentication, display of accessible information, and notification of the end of communication can be performed on a Web page. An SIP (Session Initiation Protocol) server may be used as the authentication server 100.

Furthermore, the authentication server 100 may be caused to function as an address translation apparatus by setting an access control rule for allowing any access to be accepted.

Fourth Embodiment

Functional configurations and process flows of relay apparatuses have been described in the first to third embodiments with respect to access control technique and address translation technique. An address translation apparatus and process flow will be described with respect to an address translation technique only. FIG. 23 shows an exemplary functional configuration of an address translation apparatus. The address translation apparatus 30 includes a WAN interface unit 11, a LAN interface unit 12, a database unit 33, an address translation unit 34, and an authentication unit 35.

The database unit 33 stores data such as data for address translation including an address translation table and data for user authentication.

FIG. 24 shows an example of the address translation table. FIG. 25 shows an example of the address translation table after adding an address translation rule containing, a sender IP address, which will be described later, as the source IP address.

In FIGS. 24 and 25, the column "Source IP address" indicates the sender IP address of a packet received at the WAN interface unit 11 (where, "Any" indicates that any address may be contained). The column "Destination IP address" indicates that the destination IP address of a packet received at the WAN interface unit 11. The column "Protocol/Destination port number" indicates the protocol and destination port number of a packet received at the WAN interface unit 11. The column "Internal IP address" indicates a private address within a LAN, which is set as the destination IP address of a packet received at the WAN interface unit 11 if the source and destination of the packet mach their respective values in the relevant row. The column "Protocol and port number" indicates a port number which is set as the destination port number of a packet received at the WAN interface unit 11 if the source and destination of the packet match their respective values in the relevant row. The address translation unit 34 adds or deletes an address translation rule to or from the address translation table and translates addresses of packets received at the WAN interface unit 11 and the LAN interface unit, on the basis of the address translation table.

That is, the address translation unit 34 looks at the address translation table by using the sender IP address and destination IP address of a packet received at the WAN interface unit 11, translates the destination IP address into an IP address internal to the LAN (internal IP address), and sends it to the LAN through the LAN interface unit 12.

For example, the first row in FIG. 24 indicates that a packets with the destination IP address "123.123.123.123" and the destination port number "TCP 443 (https)" is sent to the LAN, with its destination IP address being changed to "192.168.100.5" and with its destination port number being unchanged, regardless of its sender IP address.

Similarly, the second row in FIG. 24 indicates that a packet with the destination IP address "123.123.123.123" and the destination port number "TCP 22 (SSH)" is sent to the LAN, with its destination IP address being changed to "192.168.100.5" and with its destination port number being unchanged, regardless of its sender IP address.

The address translation unit 34 also reads the destination IP address of a packet received at the LAN interface unit 12 as its source IP address, searches the address translation table for the internal IP address identical to the sender IP address of the packet, translates the sender IP address of the packet to a global IP address in the WAN, and sends it to the WAN through the WAN interface unit 11.

The address translation unit 34 uses the content of a received packet to refer to the address translation table described above, starting from the top row, and, if it finds a match, ends the process concerning that packet. That is, the conditions set in upper rows in the address translation tables in FIGS. 24 and 25 are given higher priorities.

The authentication unit 35 performs authentication of a user in response to a request from the address translation unit 34.

Figure 26:
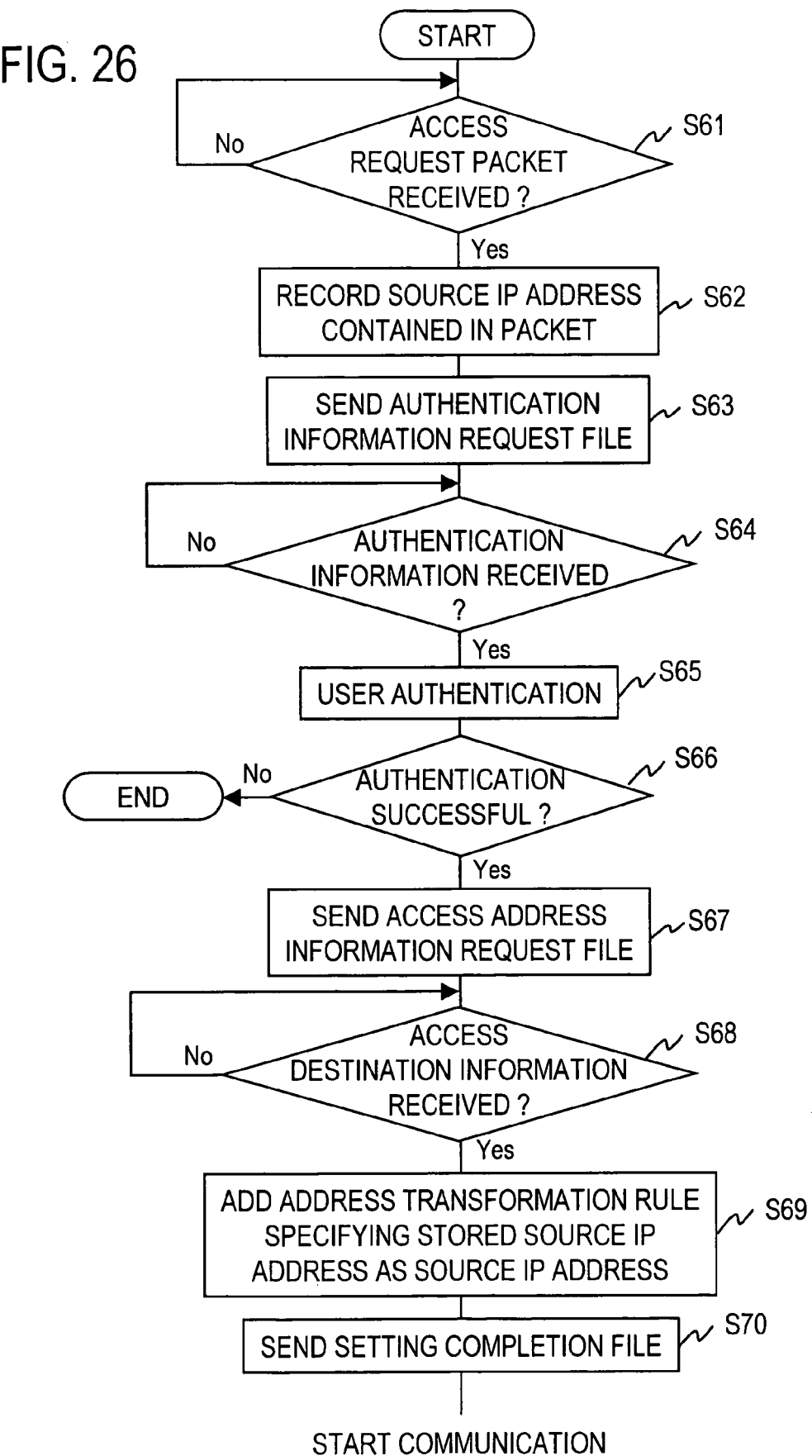
FIG. 26 is a diagram showing a process flow for the address translation apparatus to start communication in the fourth embodiment.
Figure 27:
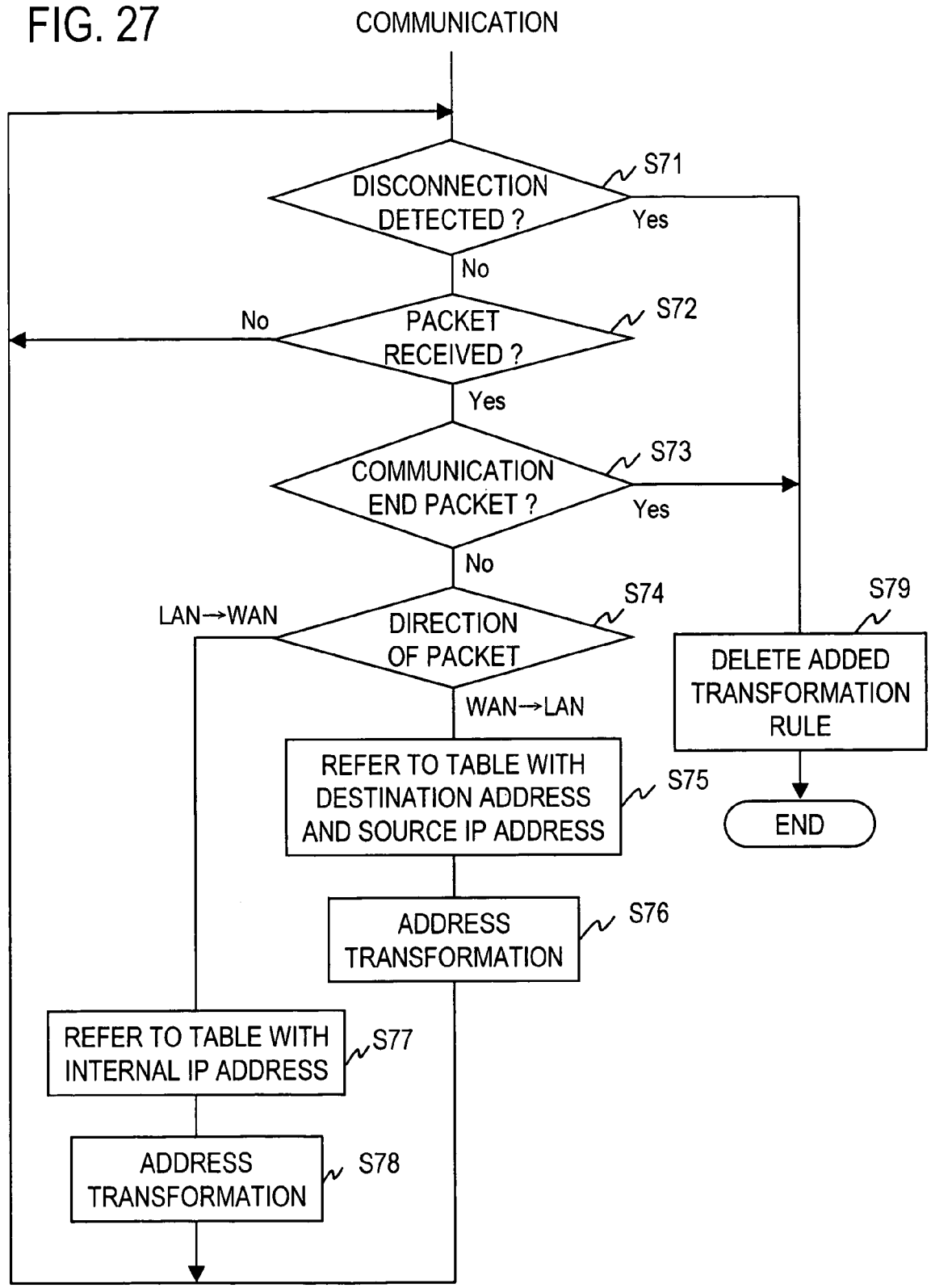
FIG. 27 is a diagram showing a process flow after the address translation apparatus starts communication in the fourth embodiment.

FIGS. 26 and 27 show a flowchart showing a process flow in the address translation apparatus. Operation of the address translation apparatus will be detailed with reference to the flowchart.

The address translation unit 34 receives an http access request (request for initiating communication) packet directed to the address of the address translation unit from a terminal device 220 on the WAN through the WAN interface unit 11 (step S61), stores the sender IP address of the access request packet as the IP address of the sending terminal device (step S62), and sends an HTML (HyperText Markup Language) file for allowing the user to enter identification information and a password of the user which are required for authentication of the user to the access requesting terminal device 220 through the WAN interface unit 11 (step S63).

The address translation unit 34 receives the identification information and password of the user from the access requesting terminal device 220 (step S64) and transfers the received user identification information and password to the authentication unit 35 to request it to perform authentication of the user (step S65).

The authentication unit 35 receives the user identification information and password and searches through user information stored in the database unit 33 for a user having identification information that matches the received user identification information. If it finds a matching user, the authentication unit 35 compares the stored password of the user with the received password. If they match, the authentication unit 35 sends an authentication success to the address translation unit 34 (step S66). If no matching user is found or the passwords do not match each other, then the authentication unit 35 sends an authentication failure to the address translation unit 34. In this case, the user may be prompted to input identification information and a password again and, if no match is found after a predetermined number of retries, an authentication failure may be sent.

If the address translation unit 34 receives an authentication success from the authentication unit 35, the address translation unit 34 sends an HTML file for allowing the user to enter the intra-LAN private address, the protocol, and the port number of a server to which the user wants to access to the access requesting terminal device 220 through the WAN interface unit 11 (step S67).

When receiving the private address, protocol and port number from the access requesting terminal device 220 (step S68), the address translation unit 34 adds to the address translation table in the database unit 33 an address translation rule in which the stored sender IP address of the http access request packet is set as the source IP address, the received private address is set as the internal IP address, the protocol and port number are set as the destination port number (step S69).

For example, if the destination IP address of the http access request packet having the sender IP address "111.222.234.123", the destination IP address "123.123.123.123", and the destination port number "TCP 22" is to be changed to the internal IP address "192.168.100.4, an address translation rule for the terminal that has accessed using http is added at the top column of the table in FIG. 24, as shown in FIG. 25.

In accordance with this rule, the destination IP address of packets with the sender IP address "111.222.234.1233 and the destination port number "TCP 22" will be changed to "192.168.100.4" and then the packets will be sent to the LAN, and the destination IP address of the other packets whose sender IP address contains the destination port number "TCP 22" will be changed to "192.168.100.5" and then the packets will be sent to the LAN.

Then, the address translation unit 34 sends an HTML file to the access requesting terminal device 220, indicating the fact that authentication has been succeeded and an address translation rule has been set, and indicating information such as the private address, the protocol, port number, and the like in the LAN to which the translation is sent (step S70). A program is embedded in the HTML file for the terminal to access a relay apparatus 10a at predetermined time intervals.

The sent HTML file is displayed on the access requesting terminal device 220 so that the user can check the set address translation information. Then, the terminal device 220 uses a program, such as a script, embedded in the HTML file to automatically perform http communication with the address translation terminal 30 at regular time intervals.

Once the address translation table has been set, the process flows as follows. When the address translation unit 34 receives a packet from the WAN interface unit 11 (steps S72 and S74), the address translation unit 34 looks at the address translation table by using the sender IP address and destination IP address of the packet (step S75), translates the destination IP address to an IP address internal to the LAN (internal IP address) (step S76), and sends it to the LAN through the LAN interface unit 12.

When the address translation unit 34 receives a packet from the LAN interface unit 12 (steps S72 and S74), the address translation unit 34 looks at the address translation table by using the packet's internal IP address (step S77). The address translation unit 34 then translates the sender IP address of the packet from the internal IP address to a global IP address in the WAN (step S78) and sends the packet to the WAN through the WAN interface unit 11.

In this way, communication with the server in the LAN is performed. When the user of the terminal device 220 wants to end the communication, the user selects a communication end button on a screen of the HTML file received from the address translation unit 30 to send a communication end packet, or closes the screen.

When the address translation unit 34 of the address translation apparatus 30 detects disconnection of the communication by detecting the closure of the HTML screen (step S71) of the access requesting terminal device 220 or receives a communication end packet (step S73), the address translation unit 34 deletes the added address translation rule from the address translation table changed as shown in FIG. 25 (step S79) to restore it to the initial state shown in FIG. 24.

In this way, according to the present embodiment, an address translation rule can be set by using a condition including a source IP address, therefore packets directed to the same port number can be delivered to different servers according to source IP addresses or communication with different terminals using a protocol having no port number can be provided according to source IP addresses.

Furthermore, because a changed setting in the address translation table is restored to its original state with a request of a user or after the communication is disconnected, wrong access due to the changed setting can be prevented.

While http is used for a terminal to access the address translation apparatus in this embodiment, any of other protocols such as https, telnet, and SIP (Session Initiation Protocol) may be used. While user authentication is performed in this embodiment, a request for authentication may be omitted for an access request from a preset terminal.

Fifth Embodiment

Figure 28:
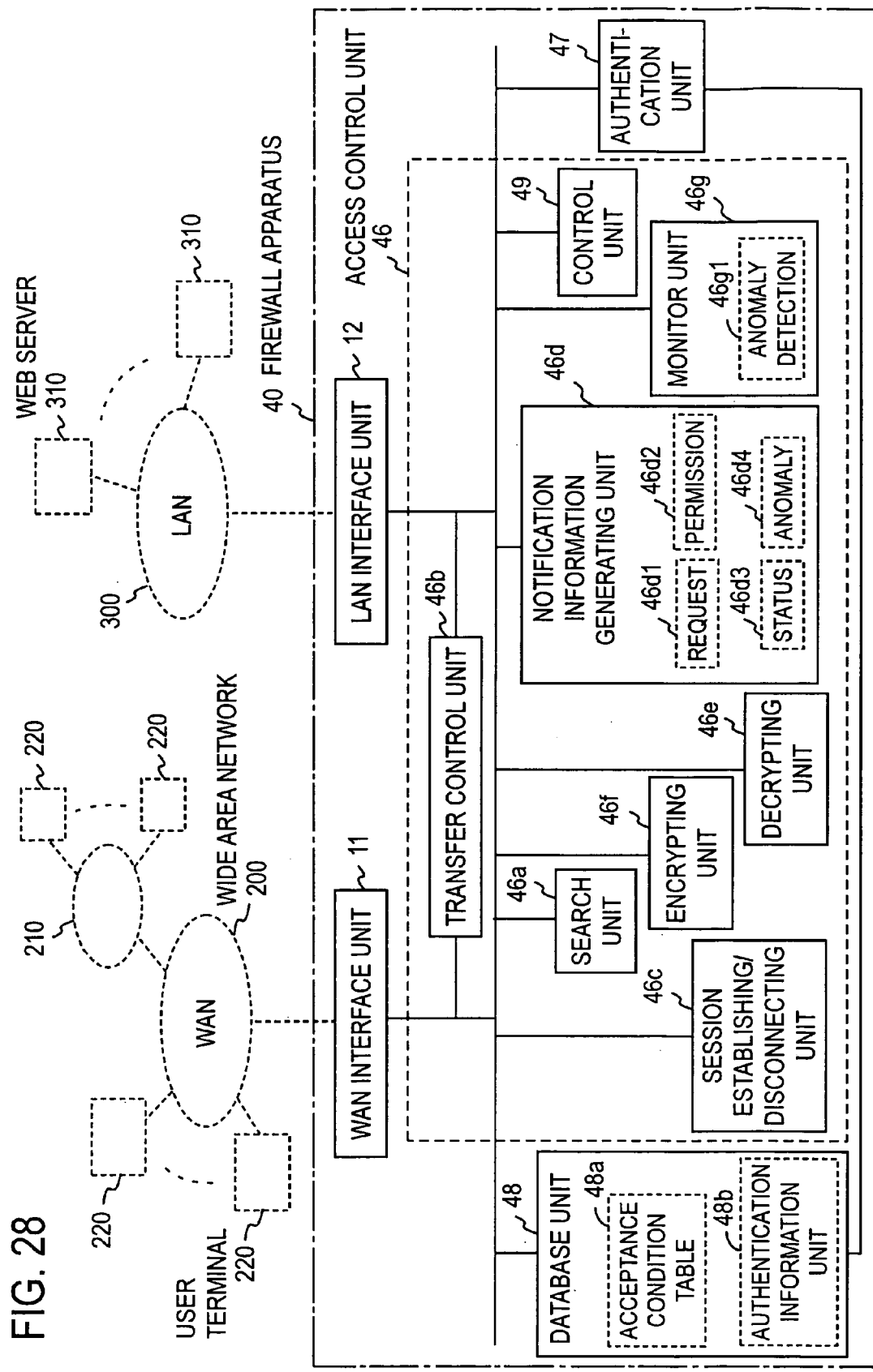
FIG. 28 is a diagram showing an exemplary functional configuration of a firewall apparatus.
Figure 29:
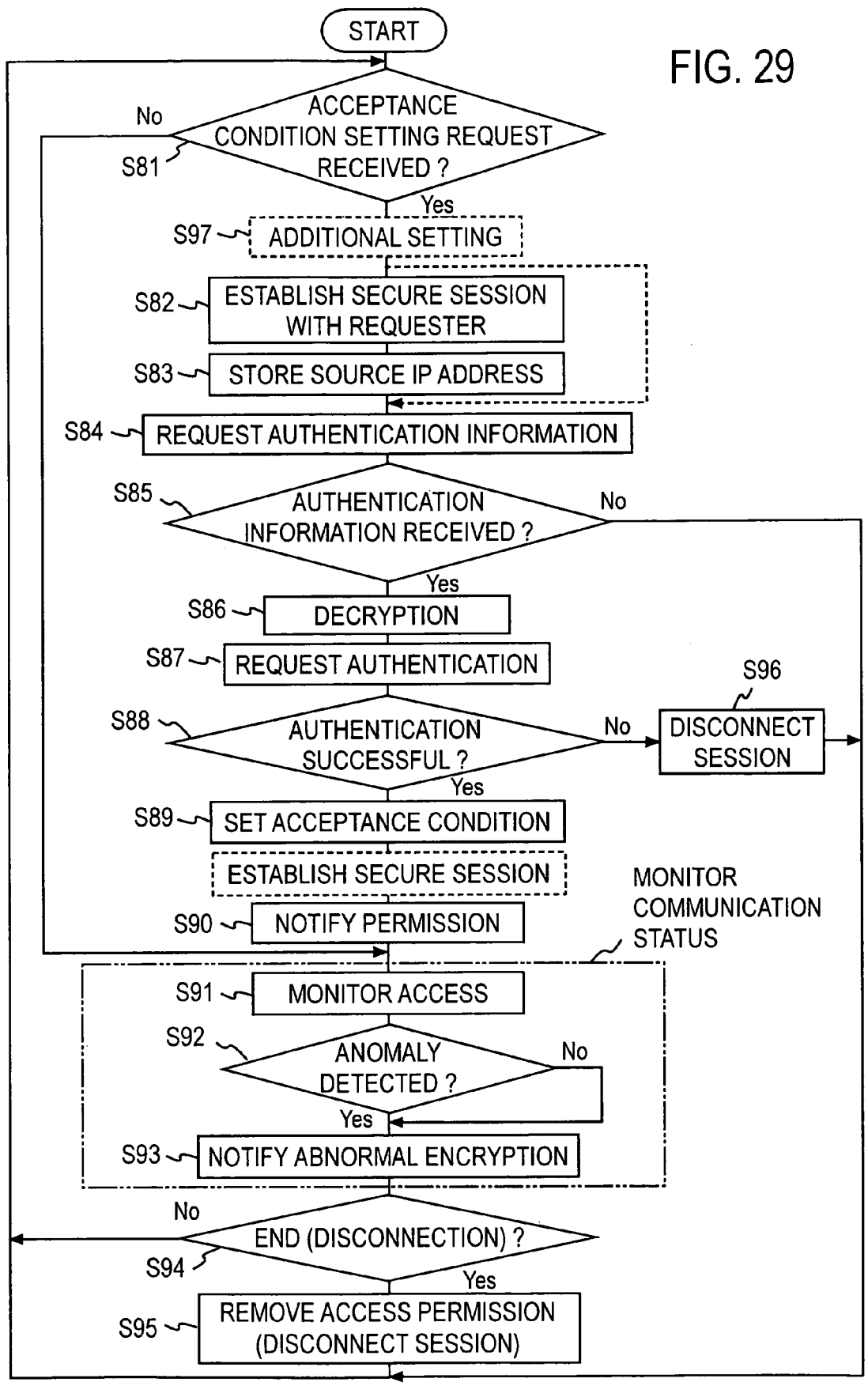
FIG. 29 is a diagram showing a process flow in the firewall apparatus.

A technique that uses only an access control technique of the present invention will be described in a fifth embodiment. FIGS. 28 and 29 show an exemplary functional configuration of a firewall apparatus and a procedure of a firewall method, respectively.

The firewall apparatus 40 in the present embodiment is connected to a wide area network (WAN) 200 and includes a WAN interface unit 11 for sending and receiving packets to and from the WAN 200, a LAN interface unit 12 for sending and receiving packets to and from a LAN 300, an access control unit 46 which analyzes packets received at the WAN interface 11 and the LAN interface 12 to control access, an authentication unit 47 which performs authentication of a user in response to a request from the access control unit 46, a database unit 48 which stores data for access control and data for authentication.

A table as shown in FIG. 30 is stored in an access control table (acceptance condition table) 48*a* in the database unit 48. The access control unit 46 determines on the basis of this table whether or not a packet received at the WAN interface unit 11 should be transferred to the LAN 300 through the LAN interface unit 12.

In FIG. 30, the column "Source IP address" indicates the sender IP address of a packet received at the WAN interface unit 11; the column "Source port number" indicates the source port number of a packet received at the WAN interface unit 11; the column "Destination IP address" indicates the destination IP address of a packet received at the WAN interface unit 11; the column "Protocol/Destination port number" indicates the destination port number (in this example, this is indicated by the protocol name associated with the port number) of a packet received at the WAN interface unit 11; and the column "Action" indicates that an action indicted in the row in the acceptance condition table (access control table) 48*a* that contains an source IP address, a source port number, a destination IP address, and protocol/destination port number that match the source information and destination information of a packet received at the WAN interface unit 11 is performed on the packet.

The association between a protocol name and a port number used in the column "Protocol/Destination port number" is preset. A numerical value, namely, a port number itself, may be set in the column "Protocol/Destination port number".

For example, because the source IP address and source port number in the first row of the acceptance condition table in FIG. 30 is "Any", packets with the destination IP address "111.111.111.2" and the destination port number "http (Hypertext Transport Protocol, for example TCP (Transmission Control Protocol) 80" are sent to the LAN 12 (Accept), regardless of the IP address and port number.

The second row of the acceptance condition table in FIG. 30 indicates that a packet having the source IP address "123.123.123.1", the upper part of the destination IP address "111.111.111", and the destination port number "http (Hypertext Transfer Protocol Security, for example TCP 443)" is sent to the LAN 300. Because both source and destination columns of the third row contain "Any" and the column "Action" contains "Drop", the third row indicates that all packets are dropped (Drop).

A search unit 46*a* in the access control unit 46 checks the acceptance condition table 48, starting from the top row, to see if it contains a match with the source and destination information of the received packet. If it does, the specified action is performed on a transfer control unit 46*b* and then the process concerning the packet ends. In this example, the conditions set in upper rows in the acceptance condition table 48*a* in FIG. 30 are given higher priorities.

With reference to FIG. 29 as well, operation of the access control unit 46 will be described in detail. When receiving a packet requesting for setting an https acceptance condition that is directed to the address of the firewall apparatus 40 (step S81), a session establishing/disconnecting unit 46*a* establishes a secure session (SSL (Secure Socket Layer) session) with the sending user terminal 220 connected on the WAN 200 (step 82). If the session is successfully established, the IP address of the sending user terminal 220, which is obtained during establishing the session, is stored in the database unit 48, for example (step S83). Furthermore, a requesting unit 46*d*1 of a communication information generating unit 46*d* sends an authentication information request to the user terminal 220 (step S84). For example, an HTML file for allowing the user to enter the user's identification information and password is encrypted and sent to the requesting user terminal 220 through the WAN interface unit 11. In this example, in addition to the IP address of the requesting user terminal 220, other conditions contained in the condition setting request packets are stored in the acceptance condition table (access control table) 48*a* in the database unit.

When receiving the encrypted user identification information and password from the requesting user terminal 220 (step S85), a decrypting unit 46*e* decrypts the encrypted authentication information (step S86) and sends the decrypted user identification information and password to the authentication unit 47 to request it to perform authentication of the user (step S87).

When receiving the user's identification information and password, the authentication unit 47 searches through user information stored the authentication information unit 48*b* in the database unit 47 for a user having the identification information that matches the received user identification information. If the authentication unit, 47 finds a matching user, the authentication unit 47 compares a password of the user stored in an authentication information unit 48*b* with the received password. If they match, the authentication unit 47 sends an authentication success to the access control unit 46. If a matching user is not found or the passwords do not match, the authentication unit 47 sends an authentication failure to the access control unit 46.

If the access control unit 46 receives the authentication success from the authentication unit 47 (step S88), the access control unit 46 adds to the acceptance condition table (access control table) 48*a* a row for permitting the packet to pass through, on the basis of information on the acceptance condition request from the user who has been successfully authenticated (step S89).

For example, if the successfully authenticated requesting user terminal 220 having the IP address "123.123.111.1" is to be permitted (to pass through) to access ftp (File Transfer Protocol) of a server (for example a Web server 310 on the LAN 300) having the IP address "111.111.111.3", an access control rule (acceptance condition) including the address information of the requesting user terminal 220 and the Web server 310 and the action "Accept" is added at the top of the acceptance condition table 28*a* in FIG. 30. While the sender address may be "Any" for typical acceptance conditions, the IP address of the requesting user terminal 220 is also set in this example.

Then, in the access control unit 46, a notification permission unit 46*d*2 and a status unit 46*d*3 of a notification information generating unit 46*d* generates an HTML file that displays information indicating that authentication has been succeeded, and access has been permitted, and accessible information (the name of a service (for example a Web camera) to which access is permitted, its IP address and the port number), and the communication status (indicating that the user terminal 220 having the IP address "123.123.111.1" is communicating with the server 310 having the IP address "111.111.111.3" and the port number "ftp"), and then an encrypting unit 46*f* encrypts the HTML file and sends it to the requesting terminal 220 (step S90).

The user terminal 220 decrypts the HTML file sent from the firewall apparatus 40 and displays it to present the accessible information and access status.

During the SSL session thus established between the user terminal 220 and the Web sever 310, an access monitoring unit 46*g* in the access control unit 46 monitors access from the user terminal 220 (step S91). If an anomaly detecting unit 46g1 detects an anomaly in access from the user terminal 220 (step S92), an anomaly unit 46d4 of the notification information generating unit 46d generates the notification of the anomaly and sends it to the user terminal 220 through the SSL session (step S93). Specifically, the process flows as follows.

(1) The traffic of packets from a user terminal per unit time (in MB/s, for example) is substantially constant for each service such as a video service and an audio service. Therefore, the access control unit 46 monitors the traffic of packets from a terminal having an established SSL session per unit time, and if the traffic of a service exceeds an amount which is preset for each service, the access control unit 46 sends an encrypted HTML file that displays information such as the name and the traffic of that service to the user terminal 220. The user terminal 220 decrypts and displays the sent HTML file to present information about the access that is likely to be abnormal so that the user of the user terminal 220 can find the occurrence of unauthorized access.

(2) If a request is sent from a user terminal 220 for accessing a service to which access by the user terminal 220 is not permitted, the access control unit 46 count such requests. If the count exceeds a predetermined value, for example 1, the access control unit 46 sends an encrypted HTML file that displays the service name and the count to the user terminal 220. The user terminal 220 receives the sent HTML file, decrypts and displays the HTML file so that the user can know the occurrence of unauthorized access to a server or terminal with which the user terminal 220 has not established a session.

(3) The access control unit 46 counts https access request packets from the same user terminal 220 to the firewall apparatus 40 (the number of failures of user authentication based on an acceptance condition setting request). If the count exceeds a predetermined value, the access control unit 46 sends an encrypted HTML file that displays indication that the number of authentication failures is abnormal and displays the count value, to the user terminal 220. When the user terminal 220 receives such anomaly notification, the user terminal 220 decrypts and displays the sent HTML file. If unauthorized access by a party impersonating an authorized user occurs, the authorized user can know the occurrence of the unauthorized access on this display.

When the user who has been permitted to access and communicating with the server 310 on the LAN 300 wants to end the communication, the user selects a communication end button on a screen displayed on the user terminal 220 by an HTML file received from the firewall apparatus 40, or disconnects the SSL session.

When the access control unit 46 of the firewall apparatus 40 receives a communication end packet or detects disconnection of the SSL session (step S94), the access control unit 46 restores the acceptance condition table 48a changed as shown in FIG. 31 to its original state shown in FIG. 30 (step S95). If the access control unit 46 receives a communication end packet, the access control unit 46 restores the acceptance condition table 48a to the original state and disconnects the SSL session.

If the communication is not ended or the session is not disconnected at step S94, the process returns to step S81. If an acceptance condition setting request is not received at step S81, the process jumps to step S91, where access is monitored. If authentication fails at step S88, the SSL session is disconnected by the session establishing/disconnecting unit 46c at step S96, then the process jumps to step S81.

It should be noted that steps S91, S92, and S93 constitute a communication status monitoring step. The control unit 49 in FIG. 28 causes the components to operate in sequence and reads, writes, or deletes data in the database unit 48.

As has been described above, according to this embodiment, authentication of a user is performed in an https session and, if the authentication is successful, an access permission (acceptance condition) corresponding to the user is added for the IP address for which the https session is requested. Therefore, a security policy (acceptance condition) of the firewall apparatus 40 can be changed from the outside of the firewall apparatus 40 with safety. Moreover, when the session is disconnected, the added acceptance condition is immediately deleted and thus unauthorized access can be prevented.

The added acceptance condition in this embodiment includes the IP address information of the authenticated requester of the acceptance condition, which also can prevent unauthorized access.

Furthermore, because the name of a service to which access by the https session is permitted and the status of communication with the IP address to which access is permitted is displayed to the user, the user can check them to prevent unauthorized access.

Moreover, a changed access permission (acceptance condition) is restored to its original setting immediately after the communication using the https session is ended in response to a request from the user or disconnection of the http session, unauthorized access using the changed acceptance condition can be prevented.

Sixth Embodiment

While an access control rule (acceptance condition) is set on a per user terminal basis in the first to fifth embodiments, the present invention can be applied to a request for adding an access control rule (request for setting an acceptance condition) on a per network basis.

A sixth embodiment will be described in which a method for adding an access control rule (acceptance condition) on a per network basis is applied to the configuration described in the fifth embodiment. It is assumed for example that a home network 210 represented by a dashed line in FIG. 28 is connected to a WAN 200 and a number of user terminals 220 are connected to the home network 210. In this case, a request for setting an acceptance condition for a network is sent along with a user's identification information and password during authentication, and a setting for permitting access from the network is made on the basis of the user's identification information. That is, the access control unit 46 sets an access permission (an acceptance condition in which "Accept" is set as "Action") for the network address of an IP address obtained during establishing an SSL session.

For example, if the user terminals connected to the network 210 (the IP address of which is 123.123.111.0/24 (the upper 24 bits are 123.123.111 and the lower bit or bits are any of 0, 1, 2, . . . , 254)) are to be permitted to access ftp (File Transfer Protocol) of a server 310 having the IP address 111.111.111.3, an acceptance condition is added at the top of the acceptance condition table 48a shown in FIG. 30 which contains the network address of the network 210 (IP address the upper 24 bits of which are 123.123.111) as the source IP address. After the addition, the table is as shown in FIG. 32.

This permits any of the user terminals 220 on the network 210, even user terminals on the network 210 that do not have a browser, to access a destination which they are permitted to access for the duration of the SSL session. The status of communication is sent to the user terminals having a browser that have issued a request for establishing the SSL session, namely the acceptance condition setting request.

Seventh Embodiment

In the sixth embodiment, an access control rule (acceptance condition) on a per network basis is added to the firewall apparatus 40 of the fifth embodiment, whereas in a seventh embodiment an access control rule (acceptance condition) on a per network basis is added to the relay apparatus 10 of the first embodiment.

The assumption is that multiple user terminals 220 are connected to the home network 210 represented by a dashed line in FIG. 2 which is connected to the WAN 200, for example. In this case, a request for setting an acceptance condition for the network is sent along with user' identification information and password during authentication, and settings for permitting the network to access are made on the basis of the user' access information. That is, the access control unit 13 sets an access permission (an acceptance condition in which "Accept" is set as "Action") for the network address of an IP address obtained during establishing an SSL session.

For example, if a user terminal (with the IP address 123.123.111.0/24 (the upper 24 bits are 123.123.111 and the lower bit or bits are any of 0, 1, 2, ..., 254) connected to the network 210 is to be permitted to access ftp (File Transfer Protocol) of a server 310 having the IP address 111.111.111.3, an acceptance condition is added at the top of the access control table shown in FIG. 3, in which the network address (the IP address the upper 24 bits of which are 123.123.111) of the network 210 is set as the source IP address. The table after the addition is as shown in FIG. 33.

In another method, an address translation rule for each of the terminals 220 on the network 210 may be added after an access control rule for the network is added as described above.

Consequently, any of the user terminals 220 on the network 210 can be permitted to access a destination to which it is permitted to access during an established SSL session and user terminals that are on the network 210 but do not have a browser can also access the destination.

Eighth Embodiment

The following process can be added to the fifth or sixth embodiment. It is possible that a packet requesting for connection to a destination may be received from a user terminal 220 during an SSL session established between that user terminal 220 and another destination if an acceptance condition is added for the IP address or network address of the user terminal 220. Specifically, a user of a user terminal having an SSL session established with a firewall apparatus 40 may want to use a service different from the one that the user is currently using. In such a case, the already established SSL session may be used to ask the user terminal whether the user permits the new connection request.

Figure 34:
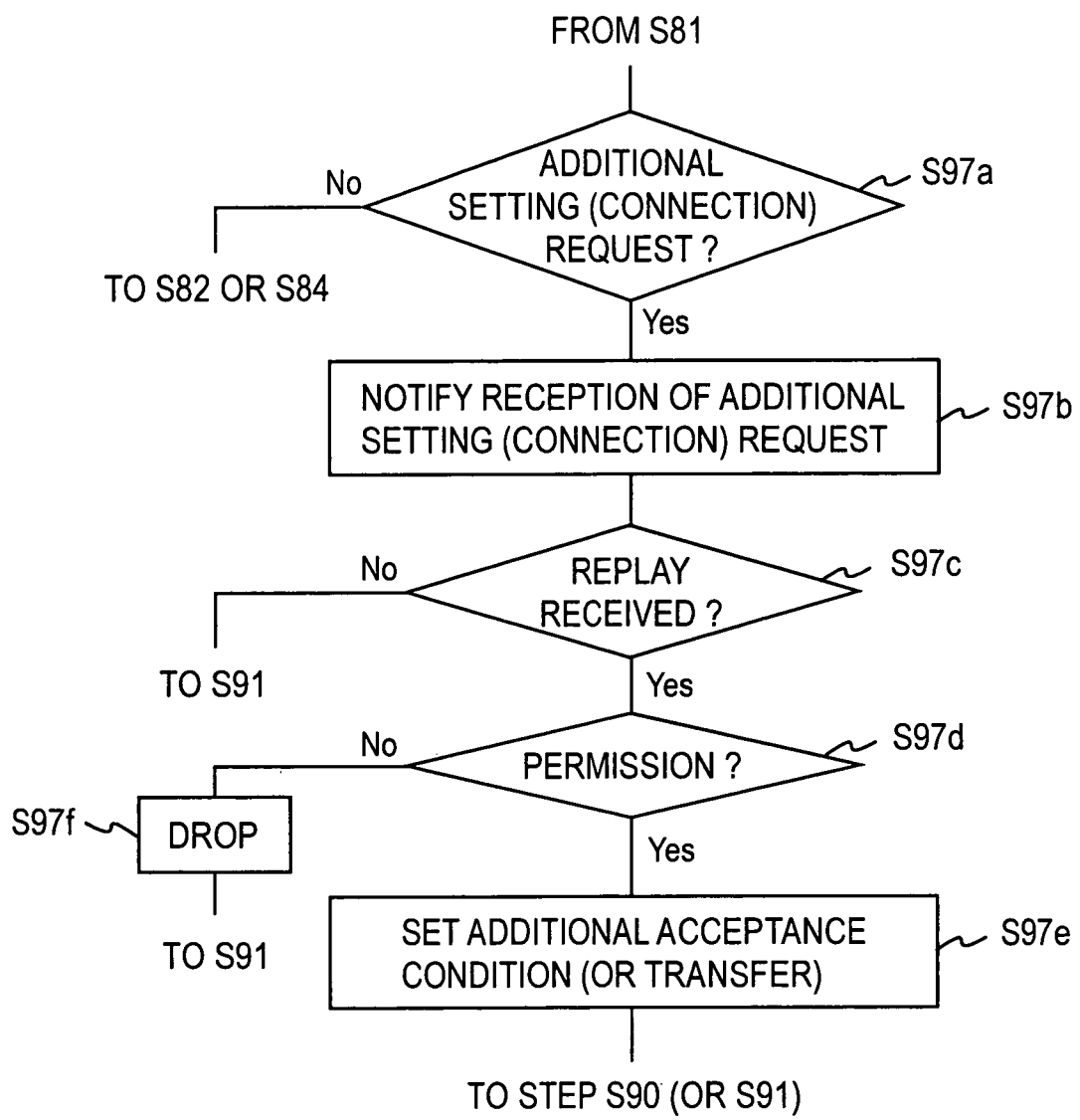
FIG. 34 is a diagram showing a process flow in a firewall apparatus in an eighth embodiment.

Specifically, the user terminal 220 uses the established SSL session to send a request for setting a new acceptance condition to the access control unit 46. The access control unit 46 performs a process for making an additional setting S97 as indicated by a dashed box below step S82 in FIG. 29. FIG. 34 shows an example of the procedure (step S97) for making an additional setting. The access control unit 46 checks the requester IP address of an acceptance condition setting request to determine whether it is a request for making an additional setting from a user terminal 220 using an established SSL session (step S97a). If so, the information generating unit 46d of the access control unit 46 generates an HTML file that displays accessible information, the access state, information indicating that a packet of an additional-setting request has been received, the IP address and port number of the destination of the additional-setting request, and a button for selecting whether to permit the additional-setting request or not, and encrypts the HTML file and sends it back to the user terminal 220 through the SSL session (step S97b).

When receiving the HTML file, the user terminal 220 decrypts and displays the sent HTML file to notify the user of the user terminal 220 that the additional setting request has been received. Thus, the user is allowed to confirm whether the user is aware of the additional-setting request.

When receiving a reply (step S97c), the access control unit 46 checks the reply. If the replay from the user terminal 220 is that the user permits the additional setting (permits the setting of the additional acceptance condition) (step S97d), the access control unit 46 sets the additional acceptance condition requested through the additional-setting request in an acceptance condition table 48a (step S97e). Subsequent packets that satisfy the added acceptance condition are sent to the destination server on the LAN through the SSL session already established. On the other hand, if the replay from the user terminal at step S97d is denial of the connection, the access control unit 46 drops the packet of the new connection request (additional-setting request) (step S97f).

In the method described above, an SSL session established already is used to add a new acceptance condition to the acceptance condition table 48 in order to connect to a server providing a different service. Alternatively, the following process may be used. The access control unit 46 performs steps S97a, S97b, S97c, and 97d shown in FIG. 34 and, if the replay at step S97d is permission, may transfer the service request packet to the appropriate server (as shown in the parentheses in step S97e). That is, a request for setting an additional condition or accessing an additional destination provided from a requesting user terminal 220 through an already established SSL session may be transferred to the destination server by using the already established SSL server without performing extra authentication.

The method described above can prevent unauthorized access because an SSL session is used to ask the user of the user terminal 220 whether a new connection request should be permitted or not.

While an https session is used as a secure session initiated from a user terminal in the fifth to seventh embodiments, any other secure session such as SSH (Secure Shell) may be used. Furthermore, the server 310 may be directly connected to the firewall apparatus 40 as indicated by a dashed line in FIG. 28. While authentication is performed after a secure session with a requesting terminal is established in response to the request for setting an acceptance condition, the authentication may be performed first. That is, when a request for setting an acceptance condition is received at step S81, the process may immediately proceed to step S84 as shown in a dashed line in FIG. 29, then authentication may be performed and, if the authentication is successful, the acceptance condition may be set in the database unit 48 at step S89, and a secure session with the requesting terminal may be established. While the authentication unit 47 is provided within the firewall apparatus 40, it may be provided outside the firewall 40 or it may be an authentication server connected to a LAN 300, for example. In either case, the authentication information unit 48b is omitted from the database unit 48. Furthermore, while user identification information and password are requested as authentication information and authentication is performed on the basis of whether or not the user information and password are contained in the authentication information unit 48b. An authentication method with a higher level of security can be used with an authentication server.

A computer may be caused to function as the relay apparatus, address translation apparatus, and firewall apparatus (access control device) described in the first to eighth embodiment. In that case, a program which cause the computer to perform the process flows may be installed in the computer from a recording medium such as a CD-ROM, magnetic disk, or semiconductor memory device, or downloaded to the computer through a communication link, to cause the computer to execute the program.

What is claimed is:

1. A relay apparatus for a terminal or a server on a private network that does not have an address on a global network to perform communication through the global network, comprising:
   a WAN interface unit which provides communication with the global network;
   a LAN interface unit which provides communication with the private network;
   an access control unit having means for controlling access from the global network to the private network in accordance with an access control rule which is established on a per sending device basis or on a per sending network basis;
   an address translation unit including,
   means for translating an address in accordance with an address translation rule, in order to transfer information from a terminal on the global network to a terminal on the private network, and
   means for translating an address in accordance with a rule established on a per sending device basis, in order to transfer information from a terminal on the private network to a terminal on the global network;
   an authentication unit which performs authentication in response to a request for access permission sent from a terminal on the global network, and
   a database unit which records the access control rule, the address translation rule, and user information used by the authentication unit to perform authentication
   wherein:
   the address translation rule dictates a translation using a combination of a sending device address on the global network and destination address of the relay apparatus on the global network to translate the destination address of the relay apparatus on the global network to destination addresses of the terminal or server on the private network,
   if a combination of the sending device address and destination address included in a packet received at the WAN interface unit is identical to the combination of the sending device address on the global network and destination address of the relay apparatus on the global network included in the address translation rule, the address translation unit translates the destination address of the packet received at the WAN interface unit to the destination address of the terminal or server on the private network,
   the access control unit further includes,
   means for adding an access control rule established on a per sending device basis or a per sending network basis to the database unit if the authentication succeeds; and
   means for deleting the added access control rule from the database unit when a predetermined criterion for ending communication is satisfied; and
   the address translation unit further includes,
   means for adding an address translation rule which sets the terminal on the global network as the sending device to the database unit if the authentication succeeds, and
   means for deleting the added address translation rule from the database unit when a predetermined criterion for ending communication is satisfied.

2. A relay apparatus for a terminal or a server on a private network that does not have an address on a global network to perform communication through the global network, comprising:
   a WAN interface unit which provides communication with the global network;
   a LAN interface unit which provides communication with the private network;
   an access control unit having means for controlling access from the global network to the private network in accordance with an access control rule which is established on a per sending device basis or on a per sending network basis;
   an address translation unit including:
   means for translating an address in accordance with an address translation rule, in order to transfer information from a terminal on the global network to a terminal on the private network, and
   means for translating an address in accordance with a rule established on a per sending device basis, in order to transfer information from a terminal on the private network to a terminal on the global network; and
   a database unit which records the access control rule and the address translation rule, wherein:
   the address translation rule dictates a translation using a combination of a sending device address on the global network and destination address of the relay apparatus on the global network to translate the destination address of the relay apparatus on the global network to destination addresses of the terminal or server on the private network,
   if a combination of the sending device address and destination address included in a packet received at the WAN interface unit is identical to the combination of the sending device address on the global network and destination address of the relay apparatus on the global network included in the address translation rule, the address translation unit translates the destination address of the packet received at the WAN interface unit to the destination address of the terminal or server on the private network,
   the access control unit further includes,
   means for adding an access control rule established on a per sending device basis or on a per sending network basis to the database unit in response to a request from an authentication sever which performs authentication of a terminal on the global network, and
   means for deleting the added access control rule from the database unit when a predetermined criterion for ending communication is satisfied; and
   the address translation unit further includes,
   means for adding an address translation rule which sets the terminal on the global network as the sending device to the database unit in response to a request from the authentication server, and means for deleting the added address translation rule from the database unit when a predetermined criterion for ending communication is satisfied.

3. An authentication server which permits access to the relay apparatus according to claim 2, comprising:
- an interface unit which provides communication with a terminal on the global network and the relay apparatus;
- an authentication unit which performs authentication in response to a request for permission to access the relay apparatus from a terminal on the global network;
- a control unit including,
- means for requesting the relay apparatus to add an access control rule and an address translation rule which sets the terminal on the global network as the sending device for a packet from the terminal on the global network if authentication at the authentication unit succeeds, and
- means for requesting the relay apparatus to delete the added access control rule and address translation rule when a predetermined criterion for ending communication is satisfied; and
- a database unit which records information associating user information used by the authentication unit to perform authentication with an access control rule and address translation rule requested to be added.

4. A relay apparatus for a terminal or a server on a private network that does not have an address on a global network to perform communication through the global network, comprising:
- a WAN interface unit which provides communication with the global network;
- a LAN interface unit which provides communication with the private network;
- an access control unit having means for controlling access from the global network to the private network in accordance with an access control rule which is established on a per sending device basis or on a per sending network basis;
- an address translation unit including:
- means for translating an address in accordance with an address translation rule, in order to transfer information from a terminal on the global network to a terminal on the private network, and
- means for translating an address in accordance with a rule established on a per sending device basis, in order to transfer information from a terminal on the private network to a terminal on the global network; and
- a database unit which records the access control rule and the address translation rule, wherein:
- the address translation rule dictates a translation using a combination of a sending device address on the global network and destination address of the relay apparatus on the global network to translate the destination address of the relay apparatus on the global network to destination addresses of the terminal or server on the private network,
- if a combination of the sending device address and destination address included in a packet received at the WAN interface unit is identical to the combination of the sending device address on the global network and destination address of the relay apparatus on the global network included in the address translation rule, the address translation unit translates the destination address of the packet received at the WAN interface unit to the destination address of the terminal or server on the private network,
- the access control unit further includes,
- means for adding an access control rule established on a per sending device basis to the database unit in response to a request for initiating communication from a terminal on a private network, and
- means for deleting the added access control rule from the database unit when a predetermined criterion for ending communication is satisfied; and
- the address translation unit further includes,
- means for adding a rule established on a per sending device basis to the database unit in response to a request for initiating communication from a terminal on the private network, and
- means for deleting the added rule from the database unit when a predetermined criterion for ending communication is satisfied.

5. A relay apparatus for a terminal or a server on a private network that does not have an address on a global network to perform communication through the global network, comprising:
- a WAN interface unit which provides communication with the global network;
- a LAN interface unit which provides communication with the private network;
- an access control unit having means for controlling access from the global network to the private network in accordance with an access control rule which is established on a per sending device basis or on a per sending network basis;
- an address translation unit including:
- means for translating an address in accordance with an address translation rule, in order to transfer information from a terminal on the global network to a terminal on the private network, and
- means for translating an address in accordance with a rule established on a per sending device basis, in order to transfer information from a terminal on the private network to a terminal on the global network;
- an authentication unit which performs authentication in response to a request for access permission sent from a terminal on the global network, and
- a database unit which records the access control rule, the address translation rule, and user information used by the authentication unit to perform authentication, wherein:
- the address translation rule dictates a translation using a combination of a sending device address on the global network and destination address of the relay apparatus on the global network to translate the destination address of the relay apparatus on the global network to destination addresses of the terminal or server on the private network,
- if a combination of the sending device address and destination address included in a packet received at the WAN interface unit is identical to the combination of the sending device address on the global network and destination address of the relay apparatus on the global network included in the address translation rule, the address translation unit translates the destination address of the packet received at the WAN interface unit to the destination address of the terminal or server on the private network,
- the access control rule and the address translation rule have a condition with the IP address of the sending device or the IP address of the sending network, the access control unit further includes, means for adding an access control rule established on a per sending device basis or a per sending network basis to the database unit if the authentication succeeds, and means for deleting the added access control rule from the database unit when a predetermined criterion for ending communication is satisfied; and the address translation unit further includes, means for adding an address translation rule which sets the terminal on the global network as the sending device to the database unit if the authentication succeeds, and means for deleting the added address translation rule from the database unit when a predetermined criterion for ending communication is satisfied.

* * * * *